(12) United States Patent
Austen et al.

(10) Patent No.: US 6,799,712 B1
(45) Date of Patent: Oct. 5, 2004

(54) CONVEYOR OVEN PROFILING SYSTEM

(75) Inventors: Paul M. Austen, Milwaukie, OR (US); Bobby Joe Rooks, Brandon, FL (US); Rex L. Breunsbach, Clackamas, OR (US)

(73) Assignee: Electronic Controls Design, Inc., Milwaukee, WI (US)

( * ) Notice: Subject to any disclaimer, the term of this patent is extended or adjusted under 35 U.S.C. 154(b) by 33 days.

(21) Appl. No.: 10/043,728

(22) Filed: Jan. 9, 2002

Related U.S. Application Data

(60) Provisional application No. 60/270,494, filed on Feb. 21, 2001.

(51) Int. Cl.$^7$ .............................. B23K 1/00; B23K 31/02
(52) U.S. Cl. ........................... 228/102; 228/103; 228/9; 219/616; 219/650; 219/656; 219/667; 219/413; 219/494
(58) Field of Search ................................ 228/8, 9, 102, 228/103; 219/616, 627, 650, 656, 667, 413, 412, 494; 432/36, 49

(56) References Cited

U.S. PATENT DOCUMENTS

| | | | | |
|---|---|---|---|---|
| 5,203,487 A | * | 4/1993 | Mishina et al. | ............. 228/102 |
| 5,413,164 A | * | 5/1995 | Teshima et al. | ............ 165/11.1 |
| 5,562,243 A | * | 10/1996 | Marcantonio | ................... 228/8 |
| 6,168,064 B1 | * | 1/2001 | Berkin | ........................... 228/9 |
| 6,352,192 B1 | * | 3/2002 | Lee et al. | .................... 228/102 |
| 6,495,800 B2 | * | 12/2002 | Richert et al. | .............. 219/388 |
| 6,560,514 B1 | * | 5/2003 | Schultz et al. | .............. 700/299 |

FOREIGN PATENT DOCUMENTS

WO PCT/US00/25002 3/2001

OTHER PUBLICATIONS

Kazmierowicz, "The Science Behind Conveyor Oven Thermal Profiling", http://www.kicthermal.com/library/tsbcot-p.html, (1992).*
KIC Pilot ™ Reflow Expert Systems, http://www.kicthermal.com/products/pilot.html, (2000).*
Jones, "*Advances in Thermal Profiling for Reflow Process Control*," Presented at SMTA 2000 Conference (2000).
Kazmierowicz, "*The Science Behind Conveyor Oven Thermal Profiling*," http://www.kicthermal.com/library/tsbcot-p.html, (1992).
"The Process Window Index: A Method For Quantifying Thermal Profile Performance," 3 pages, (date and author unknown).
KIC Pilot™ Reflow Expert Systems, http://www.kicthermal.com/products/pilot.html, (2000).

* cited by examiner

*Primary Examiner*—Kiley Stoner
*Assistant Examiner*—Kevin L. McHenry
(74) *Attorney, Agent, or Firm*—Klarquist Sparkman, LLP

(57) ABSTRACT

A system is disclosed for determining optimal process settings for a conveyor oven, such as a reflow oven used to reflow solder paste on a PCB assembly. According to a disclosed embodiment, an ideal temperature profile is obtained from the solder paste specifications of the solder paste to be reflowed in the oven. The ideal temperature profile of the paste includes a preheat phase, a soak phase, a reflow phase and a cooling phase. One or more profiles that fit the oven are obtained by aligning the beginning of each phase of the ideal profile with a forward end of an oven zone. The profile that best fits the oven is selected as a target profile for the reflow soldering process. The set points of the oven zones for effecting the target profile when the solder paste is conveyed through the oven are determined.

35 Claims, 23 Drawing Sheets

FIG. 12

CONVEYOR OVEN PROFILING SYSTEM

CROSS-REFERENCE TO RELATED APPLICATION

The present application claims priority from prior pending U.S. provisional application No. 60/270,494, filed on Feb. 21, 2001, which is incorporated herein by reference.

FIELD

The present invention concerns a profiling system for determining optimal process settings in a conveyor oven, such as a reflow oven, used for reflowing solder paste on printed circuit boards.

BACKGROUND

Conveyor ovens (also called furnaces) are used in a variety of industries including the electronics, baking, and painting industries. Generally, conveyor ovens have multiple heating zones and one or more cooling zones through which parts are conveyed. The heating zones are thermally isolated from each other by air curtains or other means. Such thermal isolation allows each zone to be maintained at a temperature that differs from other zones in the oven. A particular advantage of conveyor ovens with multiple heating zones is that products can be heated to different temperatures at different times as they pass through the oven.

In the electronics industry, conveyor ovens known as reflow ovens are used to mount integrated circuits and other electronic components to printed circuit boards (PCBs) with solder paste. Typically, the soldering process within a conveyor oven can be characterized by the following phases: the preheat or ramp phase, the dwell or soak phase, the reflow or spike phase and the cooling phase. In the preheat phase, the solder paste is heated from room temperature to a preheat temperature to promote evaporation of the solvents, or carriers, in the solder paste. During the soak phase, the solder paste is permitted to "soak" for a predetermined period of time at a temperature range at which the flux in the solder paste becomes active. In the reflow phase, the solder paste is heated above the liquidous, or melting temperature of the solder for a predetermined period of time sufficient to permit reflow (i.e., wetting) of the solder paste. In the cooling phase, the solder joint solidifies, thereby electrically bonding the components to the circuit board.

Typically, the thermal requirements for a solder paste (also called solder paste specifications) for the preheat, soak and reflow phases are specified by the manufacturer of the paste. Generally speaking, "profiling" is the process of determining the process settings for a part that will best satisfy the thermal requirements of the solder paste. Such process settings may include, for example, the temperature settings of each oven zone and the oven conveyor speed.

Devices for measuring the temperature profile of a part conveyed through an oven (i.e., the temperature response of the part) are known. For example, electronic data loggers (also called data collectors or monitors) have been developed that attach to a test PCB. One such data logger, the SuperM.O.L.E.® Gold temperature profiler, is an oven profiler sold commercially by Electronic Controls Design, Inc., of Milwaukie, Oreg. Beyond the M.O.L.E., the test PCB has various thermocouples strategically placed thereon. Traditionally, each thermocouple is connected directly to the electronic data logger. The electronic data logger is physically spaced apart from the PCB so as not to affect the heating of the PCB and thereby cause inaccurate temperature profiling. The data logger stores temperature information measured by the thermocouples, which information can be processed to determine and control the optimal temperature profile of the oven.

Typically, in the past, profiling was accomplished using a "trial and error" technique in which an operator, prior to a production run, guesses or estimates initial settings for the oven controls. Usually, the operator starts with a "known temperature profile," that is, the oven settings for which the resulting temperature response of a similar PCB conveyed through the same oven is known. An instrumented test assembly (e.g. a test assembly coupled to a data logger) is conveyed through the oven at the initial settings. The data logger is then removed from the test assembly and placed in a reader to obtain the stored data, which represents a temperature response of the assembly. The temperature response of the assembly is compared to the thermal requirements of the solder paste and other components on the board. The operator guesses or estimates changes to the oven settings for reducing the difference between the temperature response of the assembly and the thermal requirements of the process to within an allowable tolerance. The operator implements the guess by manually adjusting the oven settings and repeats the process over and over until the appropriate thermal requirements for the solder paste are reached. Of course, this process is disadvantageous in that it results in a significant number of test boards being scrapped, requires a relatively high level of operator skill and is time consuming. Other industries using conveyor ovens have experienced similar problems in setting ovens for a production run.

A need therefore exists for an improved system for profiling a conveyor oven.

SUMMARY

A method according to one embodiment is used for controlling a reflow soldering process in a multiple zone conveyor oven. An ideal temperature profile is obtained from the solder paste specifications of the solder paste to be reflowed in the oven. The ideal temperature profile of the paste may include a preheat phase, a soak phase, a reflow phase and a cooling phase. The ideal profile is applied to the oven by aligning the beginning of each phase of the ideal profile with the forward end of an oven zone so as to form a target profile that fits the oven. Once a target profile is obtained, the set points of the oven zones are determined for effecting the target profile when the solder paste is conveyed through the oven.

In a specific approach, one or more profiles may be obtained by aligning the beginning of each phase of the ideal profile with a forward end of an oven zone. The profile that best fits the oven is selected as a target profile from which the set points of the oven are determined.

After setting the set points of the oven, the temperature profile of the solder paste is measured as it is conveyed through the oven. The temperature profile of the solder paste is compared to the target profile. If there is any deviation between the temperature profile of the solder paste and the target profile, the set points of the oven are automatically adjusted to reduce any such deviation.

According to another embodiment, an apparatus is provided for controlling a soldering process in which solder paste is reflowed in a multiple zone conveyor oven. The apparatus includes means for providing an ideal temperature profile derived from the solder paste specifications of the solder paste to be reflowed in the oven and means for generating a target temperature profile for the soldering process in which the beginning of each phase coincides with the forward end of an oven zone.

The apparatus may include a database containing solder paste specifications for a plurality of solder pastes and means for selecting a solder paste from the database to be reflowed in the oven. The apparatus also may include means for displaying the target temperature profile and means for adjusting the temperature of the target profile at a point where the target profile coincides with the forward end of an oven zone.

The foregoing and other objects, features, and advantages of the invention will become more apparent from the following detailed description of several embodiments, which proceed with reference to the accompanying figures.

BRIEF DESCRIPTION OF DRAWINGS

FIG. 8 is a graph of the target profile obtained from the ideal profile of FIG. 5 and corresponding to the profile represented in FIG. 7a.

FIG. 12 shows the "Set & Verify" worksheet window of the software program in which the "Oven Setup" palette and the "Assembly Properties" palette are shown overlaying the "Set & Verify" worksheet.

DETAILED DESCRIPTION

The conveyor oven profiling system as shown and described herein includes the use of software stored on a computer-readable medium and executed on a general-purpose computer. It should be understood, however, that the invention is not limited to any specific computer language, program, operating system or computer. In addition, those of ordinary skill in the art will recognize that devices of a less general-purpose nature, such as hardwire devices, or the like, may also be used.

Computer readable media can be any available media that can be accessed by the computer. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 1:
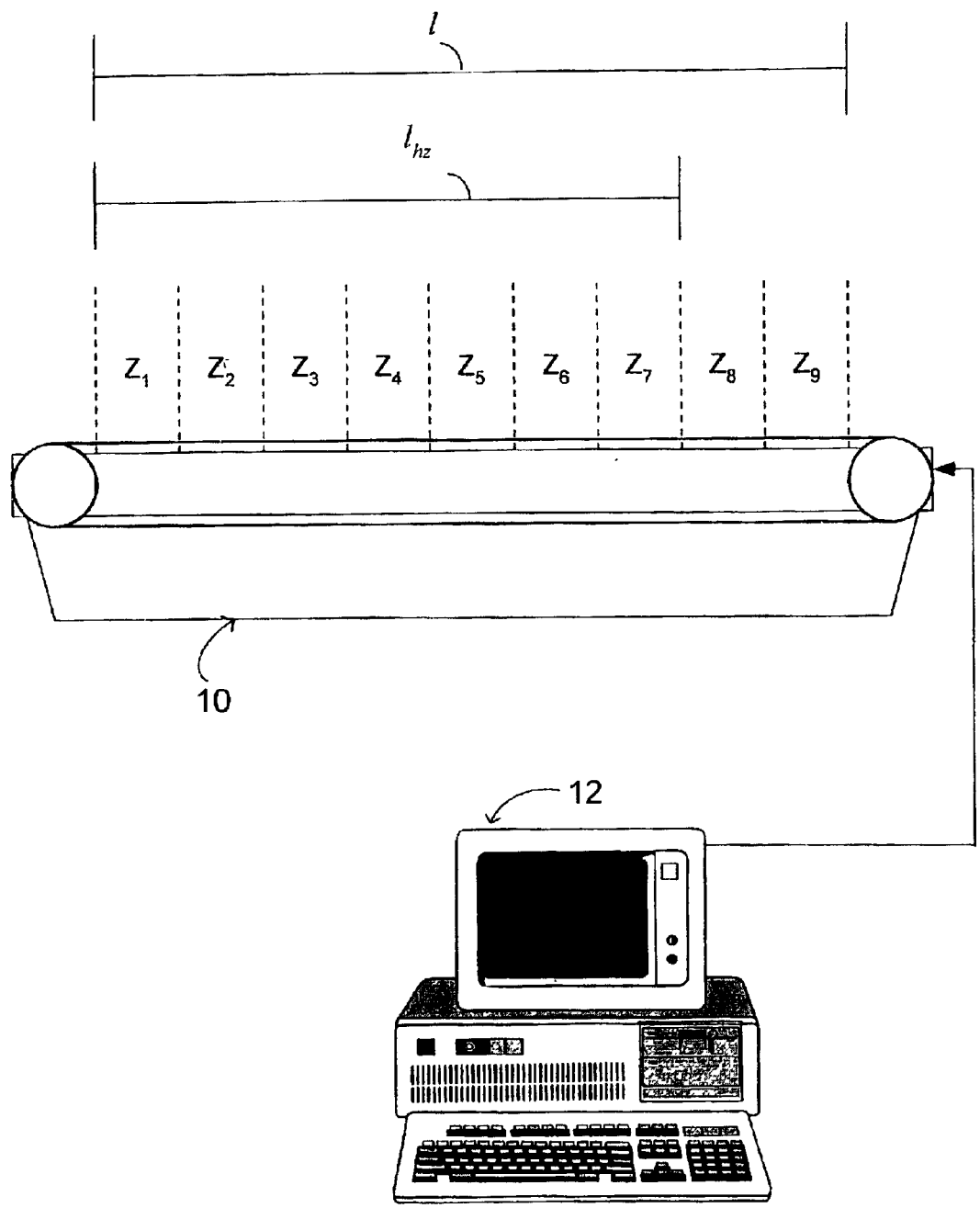
FIG. 1 is a schematic side view of a multiple zone conveyor oven linked to a general-purpose computer for controlling the process settings of the oven.

The present invention relates to a profiling system for determining optimal process settings for a conveyor oven, such as oven 10 shown in FIG. 1. In an exemplary application described in detail below, the profiling system is used to determine optimal process settings for a reflow soldering process in which PCB assemblies are conveyed through the oven 10. However, the profiling system described herein may be adapted for use with other conveyor oven processes, such as metal annealing, glue curing, paint cross linking and food processing.

Oven 10 in the present example has nine zones and an overall length l from the forward end of the first zone to the rear end of the last zone. The first seven zones ($Z_1$–$Z_7$) are heating, zones and the last two zones ($Z_8$ and $Z_9$) are cooling zones. However, the system of the present invention can be applied to a conveyor oven having any number of heating or cooling zones. In alternative embodiments, the oven may not have any cooling zones. A computer 12 may be linked to the oven 10 for controlling the process settings of the oven 10 as more fully described below.

The Ideal and Target Profiles

A target profile is the desired temperature response of the solder paste as it is conveyed through the oven. Robustness is the ability of a process to produce a stable output with a highly variable input. In a conveyor oven, a change in oven temperature, and therefore a change in the rate at which a part is heated, can only occur at the start of an oven zone. Thus, to ensure a robust process, it is desirable if the phases of a target profile are aligned with the oven zones such that each phase starts at the beginning of an oven zone.

According to one aspect of the invention, a robust target profile is derived from the ideal temperature profile of a solder paste. The "ideal temperature profile" is the temperature-time profile for a reflow soldering process derived from the ideal, or nominal, values of a given set of solder paste specifications.

Figure 2:
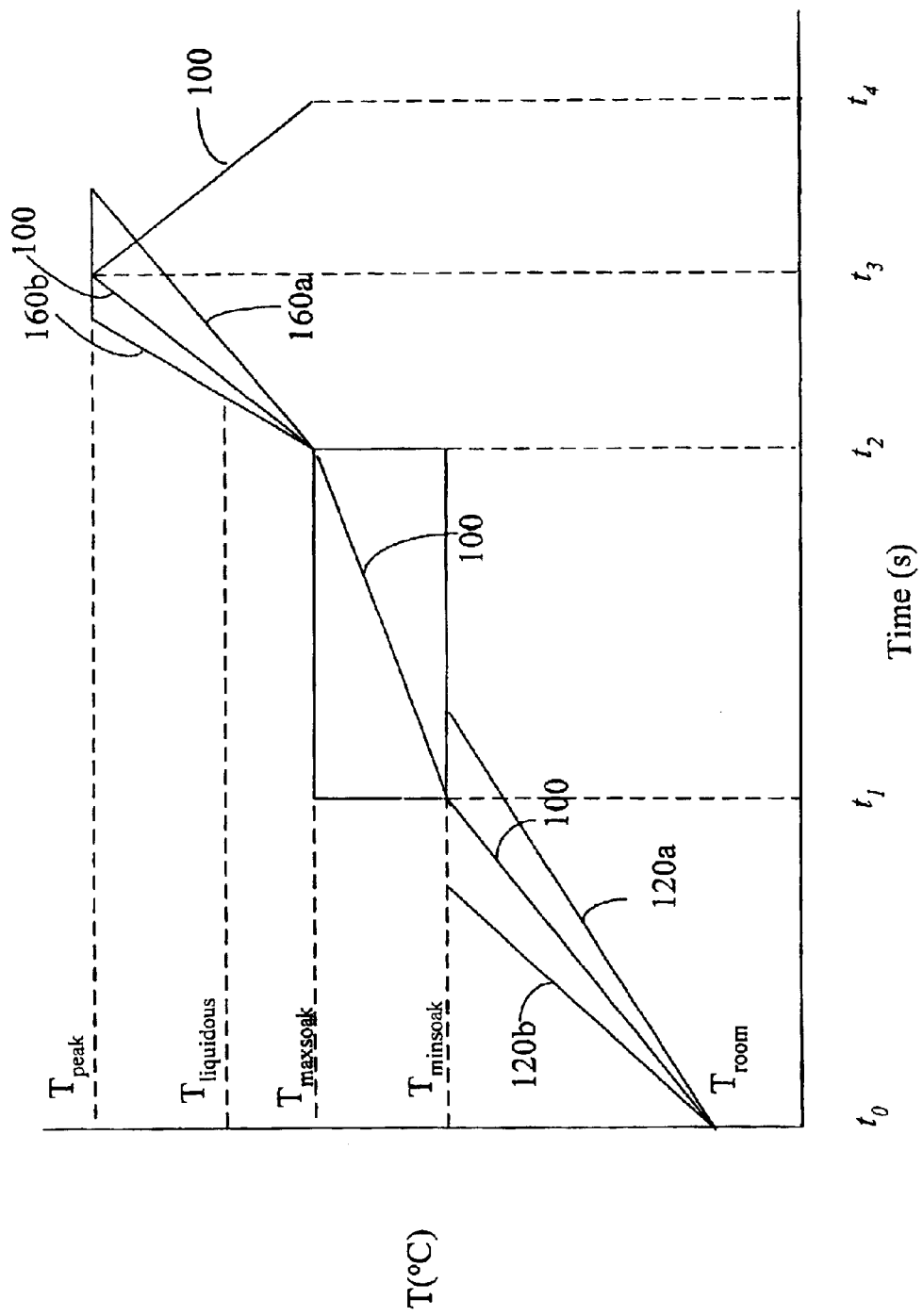
FIG. 2 is a graph containing the ideal temperature profile of a solder paste and the solder paste specification limits overlaying the ideal temperature profile.

FIG. 2 is a graph illustrating one example of an ideal temperature profile of a solder paste. As shown in FIG. 2, the graph has a horizontal time axis and a vertical temperature axis. The solder paste specifications for the preheat phase of the reflow process, in which the solder paste is heated from room temperature at time to $t_0$ a minimum soak temperature $T_{minsoak}$ at time $t_1$, includes a minimum heating rate 120a and a maximum heating rate 120b. The resulting ideal temperature profile 100 in the preheat phase ramps from room temperature to $T_{minsoak}$ at a rate that is the average of the minimum heating rate 120a and maximum heating rate 120b.

The solder paste specifications for the soak phase include the minimum soak temperature $T_{minsoak}$ a maximum soak temperature $T_{maxsoak}$, a maximum soak time and a minimum soak time. As shown, the ideal profile 100 in the soak phase ramps from $T_{minsoak}$ at time $t_1$ to $T_{maxsoak}$ at time t2. The change in time for the soak phase ($t_2$–$t_0$) is the average of the maximum soak time and the minimum soak.

Following the soak phase, the solder paste enters the reflow phase where it is heated from the maximum soak temperature $T_{maxsoak}$ at time $t_2$ to a peak temperature $T_{peak}$ above the liquidous temperature $T_{liquidous}$ of the solder paste at time $t_3$. $T_{peak}$ is the maximum allowable temperature for the most sensitive component of the process and usually is not limited by the solder paste itself. The specification limits for the reflow phase are shown as having a minimum heating rate 160a and a maximum heating rate 160b. The resulting ideal temperature profile 100 in the reflow phase ramps from $T_{maxsoak}$ to $T_{peak}$ at a rate that is the average of the minimum heating rate 160a and maximum heating rate 160b.

The cooling phase of the process occurs between time $t_3$ and time $t_4$, during which the solder paste is allowed to cool. As a practical matter, solder paste specifications typically are not provided for the cooling phase because the cooling zones in most current state-of-the-art conveyor ovens cannot be controlled beyond assuring that the cooling fans are operational. For convenience, the rate of cooling of ideal temperature profile 100 in the cooling phase is assumed to be equal, but opposite in direction, to the heating rate in the previous phase.

Once an ideal temperature profile for the solder paste is obtained, the ideal profile is applied to the oven 10 so as to provide an ideal profile in which the temperature of the solder paste is a function of the linear distance through the oven. This is accomplished by determining the length of each phase of the ideal profile as a fraction of the total length (l) of the oven. The cooling phase occurs within the cooling zones of the oven ($Z_8$ and $Z_9$). Thus, the length of the cooling phase of the ideal profile in the oven is equal to the length of the cooling zones. The preheat phase begins at the forward end of the first heating zone ($Z_1$) and the reflow phase ends at the rear end of the last heating zone ($Z_7$). The length of each phase ($l_{ideal}$) within the heating, zones (i.e., the preheat, soak and reflow phases) is determined by multiplying the change in time ($\Delta t_{phase}$) for the phase by the ratio of the overall length of the heating zones of the oven ($l_{hz}$) to the overall change in time for the process in heating zones ($\Delta t_{process}$):

$$l_{ideal} = \left(\frac{l_{hz}}{\Delta t_{process}}\right) \cdot \Delta t_{phase}. \quad \text{(Equation 1)}$$

Figure 3A:
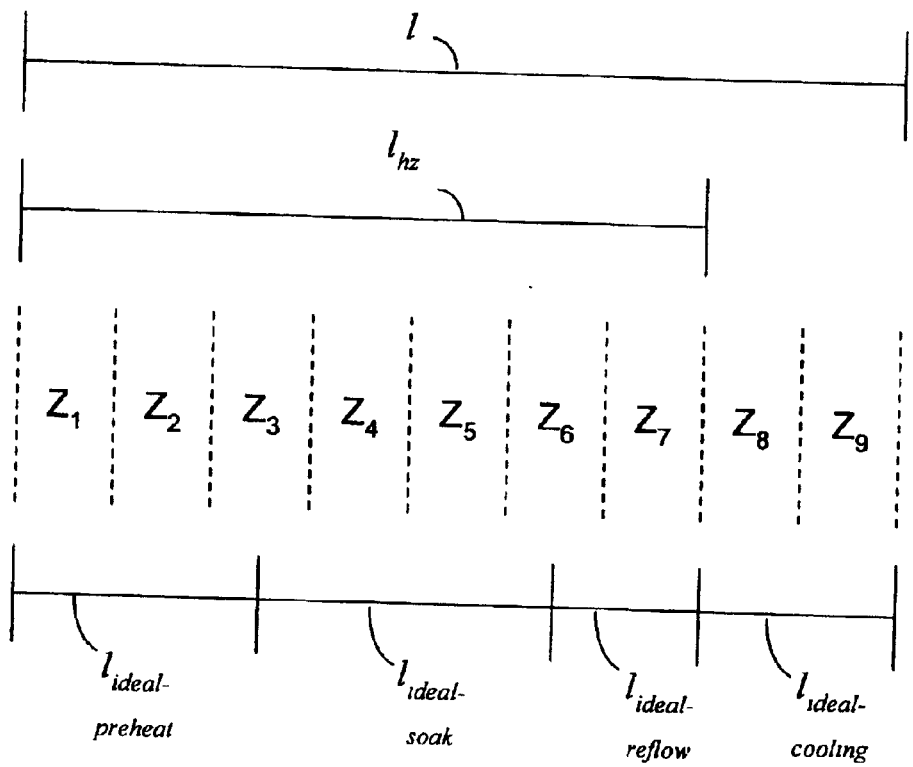
FIG. 3a is a schematic illustration of the oven zones showing the length of each phase of an ideal profile as applied to the oven wherein the beginning of the soak phase of the ideal profile falls between the forward and rear end of the third oven zone and the beginning of the reflow phase of the ideal profile falls between the forward and rear end of the sixth oven zone.

Of course, conveyor ovens are not configured for use with any particular type of solder paste. As such, depending on the actual lengths of the oven zones, application of the ideal profile to the oven 10 may result in a profile in which the beginning of the soak phase and the reflow phase may or may not coincide with the forward end of an oven zone. FIG. 3a, for example, schematically illustrates the length of each phase of an ideal profile ($l_{ideal-preheat}$, $l_{ideal-soak}$, $l_{ideal-reflow}$ and $l_{ideal-cooling}$) relative to the actual zones of the oven 10 after the ideal profile is applied to the oven. In this example, the beginning of the soak phase falls between the forward and rear end of the third zone ($Z_3$) and the beginning of the reflow phase falls between the forward and rear end of the sixth zone ($Z_6$). Depending upon the particular application, however, the beginning of soak and reflow phases may fall within zones other than the third and sixth zone. Although unlikely, in still other applications, it may be possible for the beginning of the soak phase and/or the reflow phase to coincide with the forward end of an oven zone.

Figure 4A:
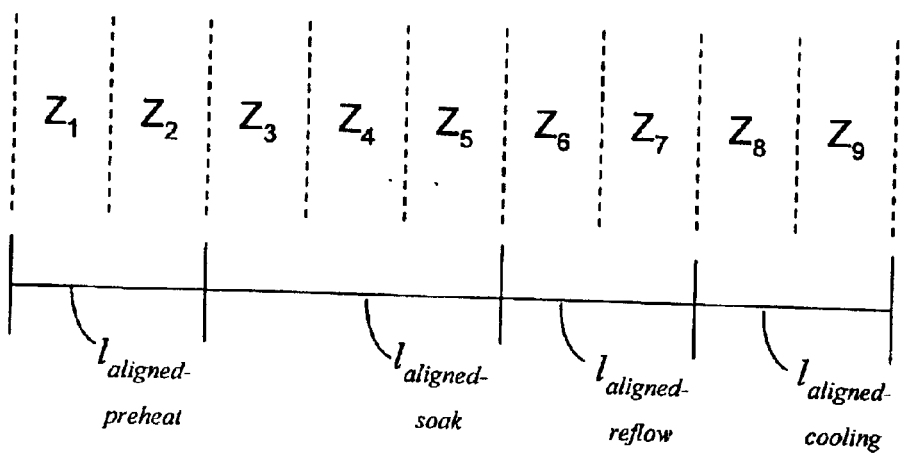
FIGS. 4a–4d schematically illustrate four profiles obtained from aligning the phases of the ideal profile of FIG. 3a with the oven zones.
Figure 4B:
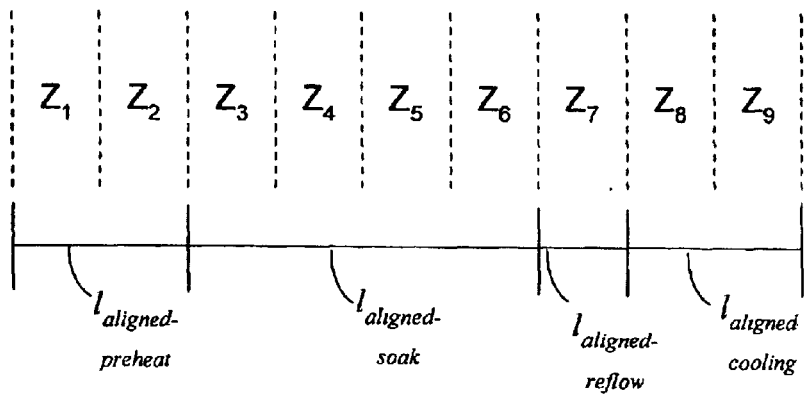
Figure 4C:
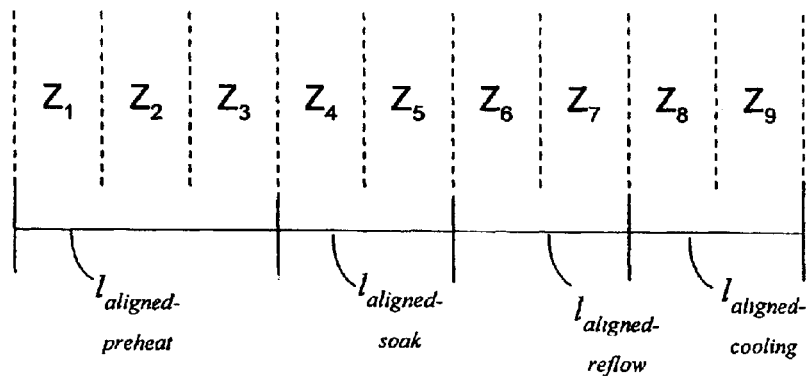
Figure 4D:
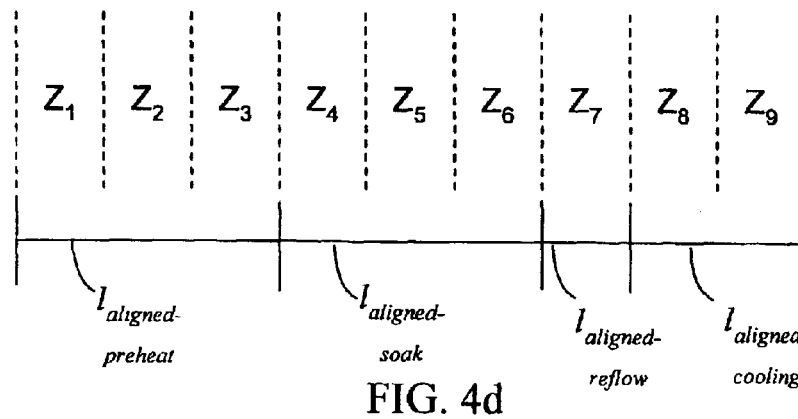

In any event, to ensure a robust process, the phases of the ideal profile are aligned with the forward ends of the oven zones to provide a profile that fits, or matches, the physical limitations of the oven 10. Where two phases of the ideal profile fall between the beginning and end of an oven zone, such as shown in FIG. 3a, at least four such profiles that fit the oven can be obtained. For example, in FIG. 3a, the beginning of the soak phase can be aligned with the forward end of $Z_3$ or $Z_4$ and the beginning of the reflow phase can be aligned with the forward end of $Z_6$ or $Z_7$. FIGS. 4a–4d illustrate the positioning of the phases along the length of the oven 10 for the four profiles that result from such alignment of the phases. FIG. 4a shows the beginning of the soak phase aligned with the forward end of $Z_3$ and the beginning of the reflow phase aligned with the forward end of $Z_6$. In FIG. 4b, the beginning of the soak phase is aligned with the forward end of the $Z_2$ and the reflow phase is aligned with the forward end of $Z_7$. FIG. 4c shows the beginning of the soak phase aligned with the forward end of $Z_3$ and the beginning of the reflow phase with the forward end of $Z_6$. FIG. 4d shows the beginning of the soak phase aligned with the forward end of $Z_3$ and the beginning of the reflow phase with the forward end of $Z_7$.

Figure 3B:
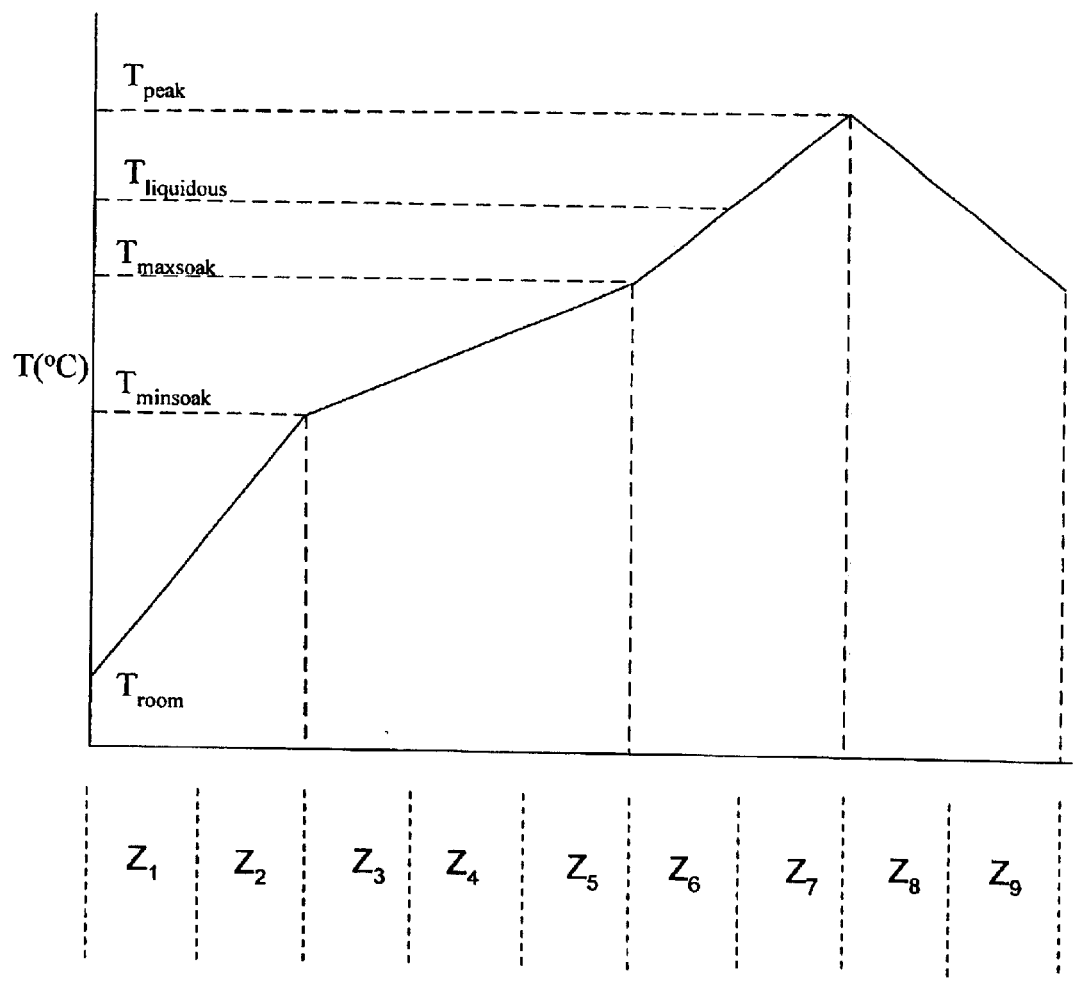
FIG. 3b is a graph of a profile obtained from aligning the beginning of the soak phase of the ideal profile of FIG. 3a with the forward end of the third oven zone and aligning the beginning of the reflow phase with the forward end of the sixth oven zone.

FIG. 3b is a graph of the profile represented in FIG. 4a. As can be seen in FIG. 3b, the illustrated profile is similar to the ideal profile 100 of FIG. 2 in that the preheat phase occurs between $T_{room}$ and $T_{minsoak}$; the soak phase occurs between $T_{minsoak}$ and $T_{maxsoak}$; and the reflow phase occurs between $T_{maxsoak}$ and $T_{peak}$. However, since the length of the preheat phase was shortened by aligning the beginning of the soak phase with the forward end of $Z_3$, the slope (i.e., rate of heating) of this phase is greater than in the ideal profile. In addition, the slope of the reflow phase in FIG. 3b is slightly smaller than in the ideal profile as a result of increasing the length of the reflow phase by aligning the beginning of the reflow phase with the forward end of $Z_6$. Similar graphs can be provided for the profiles represented in FIGS. 4b–4d.

A target profile may be selected from the four resulting profiles (FIGS. 4a–4d) and used, as explained below, to determine the process settings of the oven. Although any of the profiles of FIGS. 4a–4d may be used to determine the process settings, the most robust profile is selected as the target profile for the soldering process. The most robust profile is that which has the best "oven fit" (OF), as described in greater detail below.

In a specific embodiment, the oven fit (OF) for each profile is obtained by summing the absolute values of the ratios of the misfit (MF) of each phase to the length of the ideal phase applied to the oven ($l_{ideal}$):

$$OF = \left|\frac{MF}{l_{ideal}}\right|(\text{preheat}) + \left|\frac{MF}{l_{ideal}}\right|(\text{soak}) + \left|\frac{MF}{l_{ideal}}\right|(\text{reflow}), \quad \text{(Equation 2)}$$

wherein the misfit of a phase is defined as the difference between the length of the phase after, alignment ($l_{aligned}$) and the length of the ideal phase applied to the oven ($l_{ideal}$):

$$MF = l_{aligned} - l_{ideal} \quad \text{(Equation 3)}.$$

The ratio of the misfit to the length of the ideal phase ($MF/l_{ideal}$) represents the percent deviation of the phase length, after being aligned, from the ideal length of the phase.

In an alternative embodiment, the oven fit (OF) for each profile is obtained by summing the squares of the ratios of the misfit (MF) of each phase to the length of the ideal phase applied to the oven ($l_{ideal}$):

$$OF = \left[\frac{MF}{l_{ideal}}\right]^2(\text{preheat}) + \left[\frac{MF}{l_{ideal}}\right]^2(\text{soak}) + \left[\frac{MF}{l_{ideal}}\right]^2(\text{reflow}), \quad \text{(Equation 4)}$$

In either case, the profiles are ranked according to their oven fit and the profile with the lowest oven fit value is selected as the target profile.

In the foregoing methods, the profile with the best (i.e., lowest) overall oven fit is selected as the target profile without consideration of the resulting values for the ratios $MF/l_{ideal}$ in each profile. However, in a reflow soldering process, not all phases are of equal importance. Specifically, it is more important to ensure that there is sufficient heating of the solder paste in the reflow phase than in the soak or preheat phase. This is because reflow of the solder paste will not occur if it is not heated above its liquidous temperature for a sufficient amount of time, regardless of whether there is adequate heating within the soak or preheat phases. In this manner, it is more important that the target profile have a reflow phase that is long enough to ensure reflow of the solder paste than it is to have a near perfect soak or preheat phase (i.e., one in which the ratio $MF/l_{ideal}$ is extremely small).

Accordingly, in yet another approach, consideration is given to the ratio $MF/l_{ideal}$ for each phase in selecting the target profile. In one approach, for example, the target profile is the profile with the lowest overall oven fit in which the ratio $MF/l_{ideal}$ for the reflow phase exceeds a predetermined negative value. By selecting a profile in which the ratio $MF/l_{ideal}$ for the reflow phase is greater than a predetermined negative value, reflow of the solder paste is ensured. In a specific embodiment, the target profile is the profile with the lowest overall oven fit in which the ratio $MF/l_{ideal}$ for the reflow phase exceeds −0.1 (i.e., the length of the reflow phase is greater than 90 percent of the ideal reflow length), although this value may be varied to suit a particular application.

Example of Selecting a Target Profile

In one example, an oven has nine zones, $Z_1$–$Z_9$, such as shown in FIG. 1. The first seven zones are heating zones and the last two zones are cooling zones. The total length l for the oven is 136 inches and the total length of the heating zones $l_{hz}$ is 97 inches. Table 1 below shows the length for each zone of the oven.

TABLE 1

| $Z_1$ | $Z_2$ | $Z_3$ | $Z_4$ | $Z_5$ | $Z_6$ | $Z_7$ | $Z_8$ | $Z_9$ |
|---|---|---|---|---|---|---|---|---|
| 12.6 in. | 13 in. | 13.5 in. | 13.3 in. | 15.4 in. | 16.6 in. | 12.6 in. | 23 in. | 16 in. |

The solder paste specifications for the present example are provided below in tables 2a–2c.

TABLE 2a

Preheat Phase

| Minimum heating rate | 1 C./sec. |
|---|---|
| Maximum heating rate | 2 C./sec. |

TABLE 2b

Soak Phase

| $T_{minsoak}$ | 120 C. |
|---|---|
| $T_{maxsoak}$ | 160 C. |
| Minimum soak time | 60 sec. |
| Maximum soak time | 90 sec. |

TABLE 2c

Reflow Phase

| Minimum heating rate | 1 C./sec. |
|---|---|
| Maximum heating rate | 2 C./sec. |

TABLE 2c-continued

Reflow Phase

| | |
|---|---|
| $T_{peak}$ | 220 C. |

Figure 5:
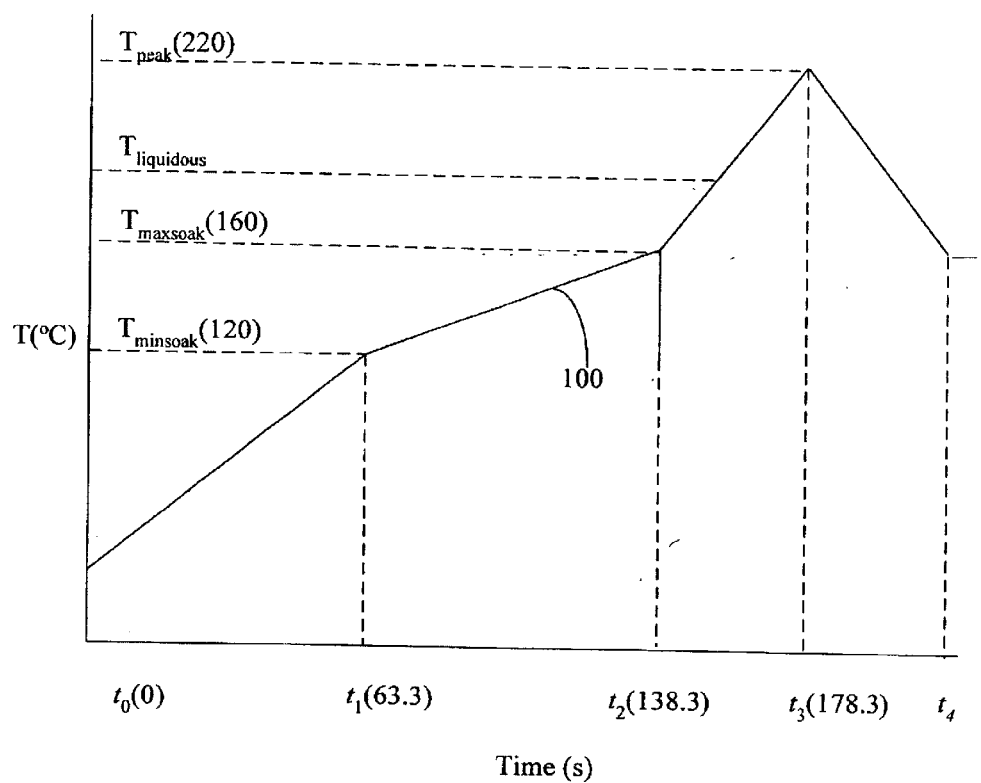
FIG. 5 is a graph of the ideal temperature profile for a solder paste according to one example.

The resultant ideal profile 100 is shown FIG. 5. The length of the cooling phase of the ideal profile, which occurs in the cooling zones of the oven ($Z_8$ and $Z_9$), is 39 inches. Table 3 below summarizes the values obtained from application of Equation 1 to determine the ideal length of each phase ($l_{ideal}$) within the heating zones of the oven.

TABLE 3

| Phase | $\Delta t_{phase}$ | $l_{ideal}$ |
|---|---|---|
| Preheat phase | 63.3 sec. | 34.4 inches |
| Soak phase | 75 sec. | 40.8 inches |
| reflow phase | 40 sec. | 21.7 inches |

Figure 6:
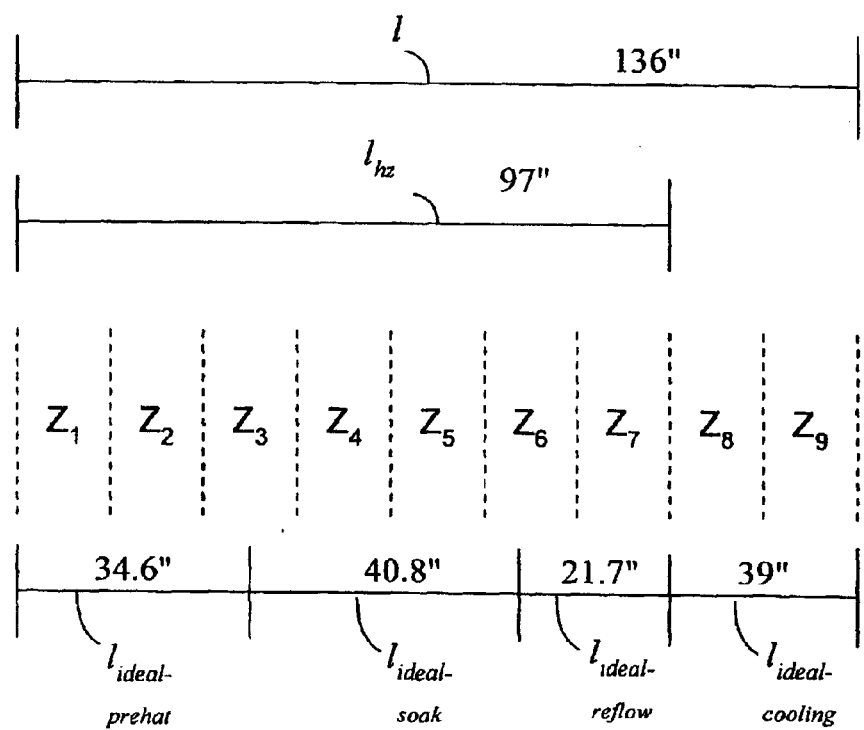
FIG. 6 is a schematic illustration of the oven zones showing the length of each phase of the ideal profile of FIG. 5 as applied to the oven.

FIG. 6 schematically illustrates the length of the ideal profile of FIG. 5 as applied to the oven being compared to the actual zones of the oven. As shown, the beginning of the soak zone falls within the third zone and the beginning of the reflow zone falls within the sixth zone. FIGS. 7a–7d show four profiles obtained from aligning the phases with the oven zones. Tables 4a–4d below summarize the misfit (MS) and the ratio MS/$l_{ideal}$ for the preheat, soak and reflow phases and the oven fit (OF) for each of the profiles represented in FIGS. 7a–7d.

TABLE 4a

Figure 7A:
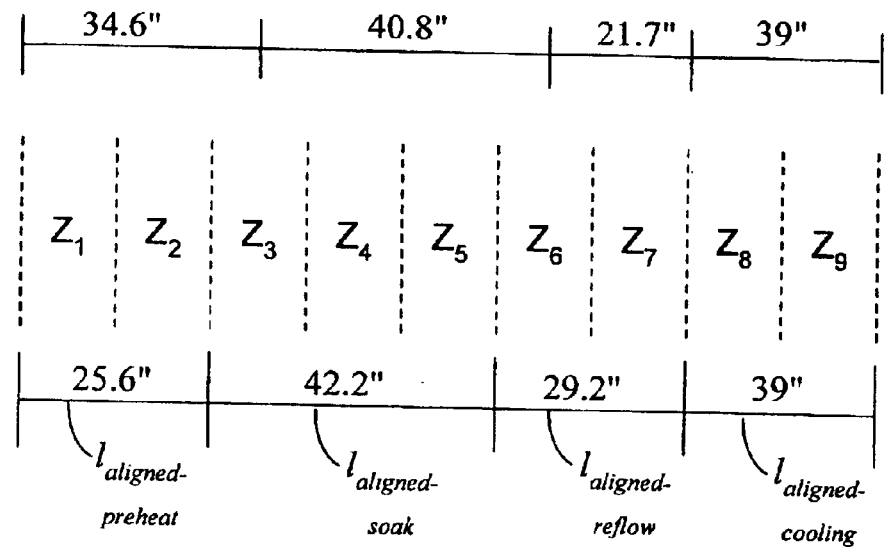
FIGS. 7a–7d schematically illustrate four profiles obtained from aligning the phases of the ideal profile of FIG. 5 with the oven zones.

| | FIG. 7a | | |
|---|---|---|---|
| | preheat | soak | reflow |
| Misfit (MS) | 25.6 − 34.6 = −9 | 42.2 − 40.8 = 1.4 | 29.2 − 21.7 = 7.5 |
| ratio MF/lideal | −9/34.6 = −.26 | 1.4/40.8 = .03 | 7.5/21.7 = .35 |
| oven fit (OF) | | .64 | |

TABLE 4b

Figure 7B:
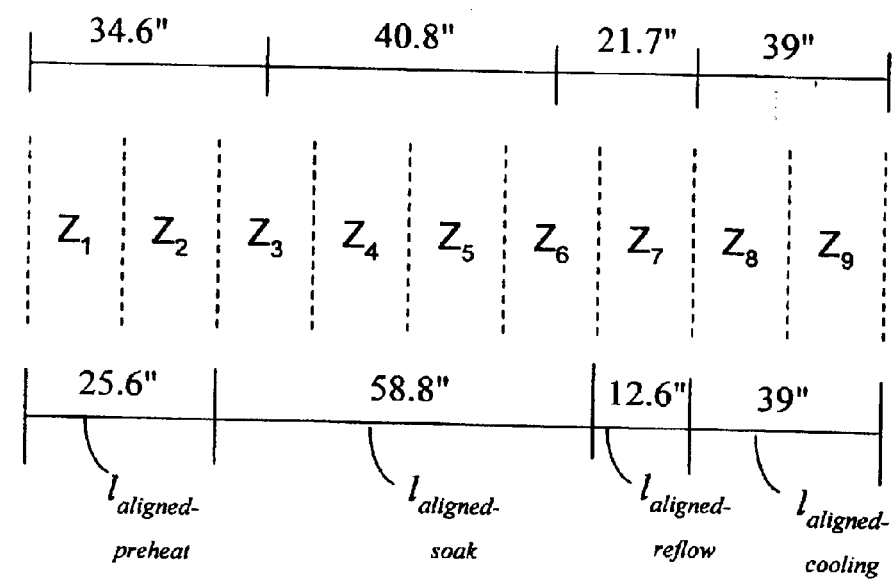

| | FIG. 7b | | |
|---|---|---|---|
| | preheat | soak | reflow |
| | 25.6 − 34.6 = −9 | 58.8 − 40.8 = 18 | 12.6 − 21.7 = −9.1 |
| | −9/34.6 = −.26 | 18/40.8 = .44 | −9.1/21.7 = −.42 |
| | | 1.12 | |

TABLE 4c

Figure 7C:
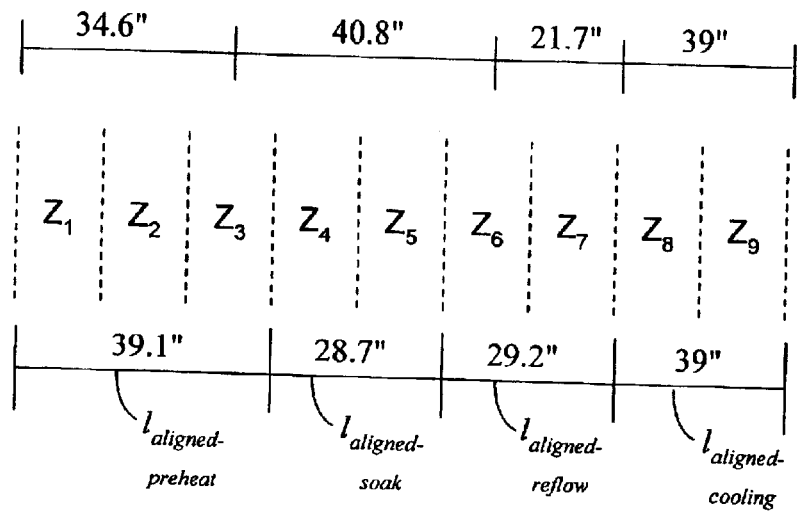

| | FIG. 7c | | |
|---|---|---|---|
| | preheat | soak | reflow |
| Misfit (MS) | 39.1 − 34.6 = 4.5 | 28.7 − 40.8 = −12.1 | 29.2 − 21.7 = 7.5 |
| ratio MF/$I_{ideal}$ | 4.5/34.6 = .13 | −12.1/40.8 = −.30 | 7.5/21.7 = .35 |
| oven fit (OF) | | .78 | |

TABLE 4d

Figure 7D:
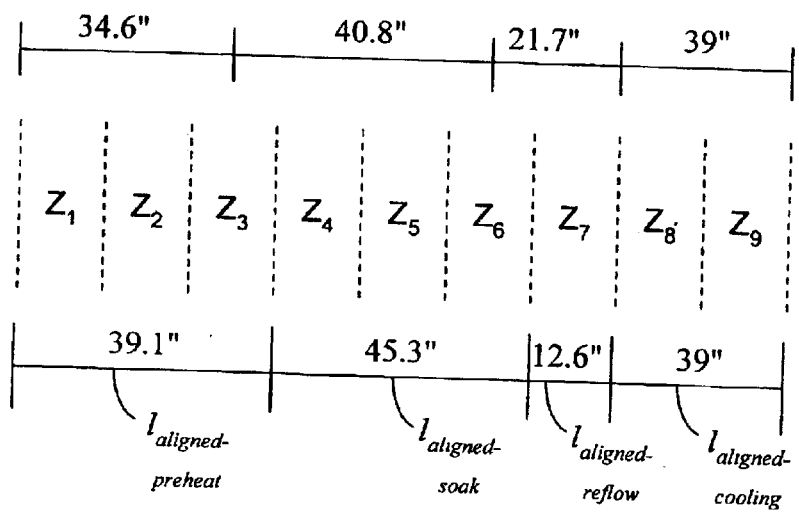

| | FIG. 7d | | |
|---|---|---|---|
| | preheat | soak | reflow |
| | 39.1 − 34.6 = 4.5 | 45.3 − 40.8 = 4.5 | 12.6 − 21.7 = −9.1 |
| | 4.5/34.6 = .13 | 4.5/40.8 = .11 | −9.1/21.7 = −.42 |
| | | .66 | |

Figure 8:
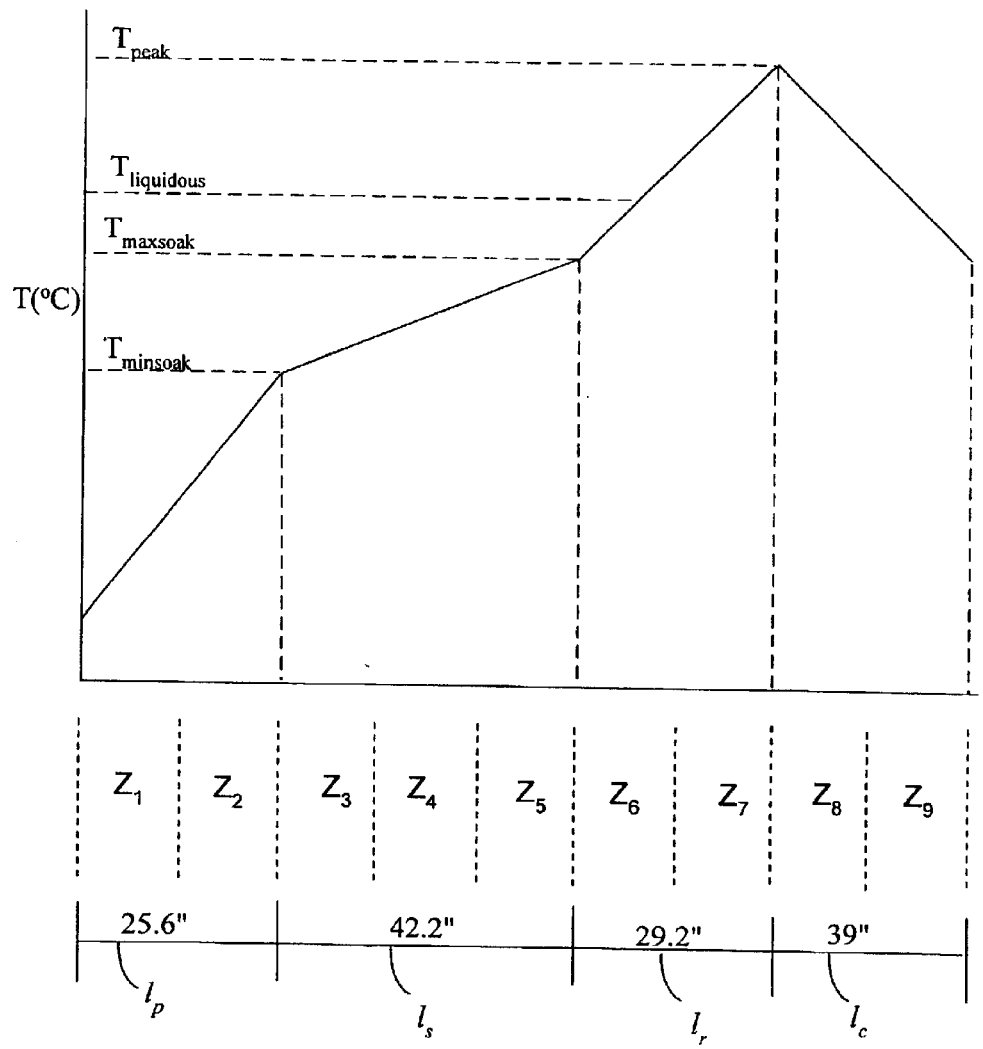

In the present example, the profile represented by FIG. 7a would be selected as the target profile since it is the profile with the best fit, that is, the lowest overall oven fit and provides for a ratio NF/$l_{ideal}$ that exceeds −0.1 in the reflow phase. FIG. 8 shows a graph of the selected target profile.

Determining Process Settings

Figure 20:
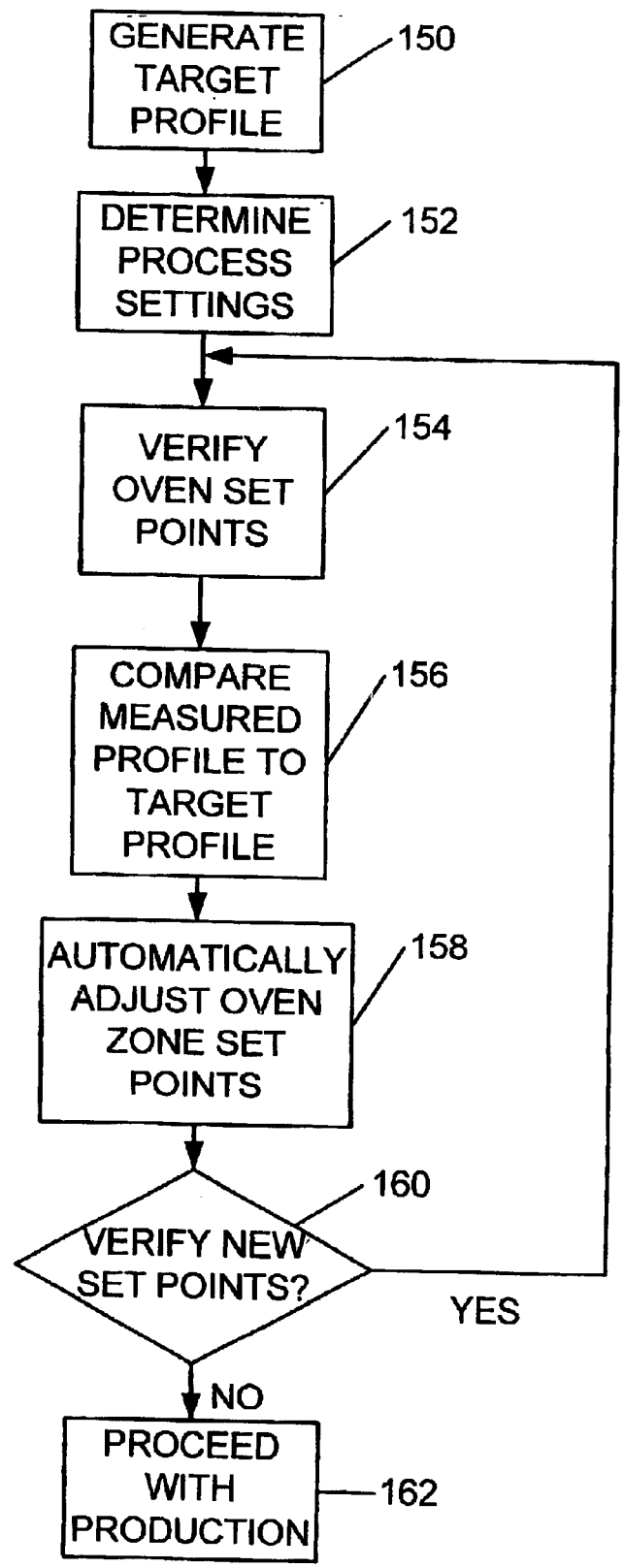
FIG. 20 is a flow diagram illustrating a profiling process according to one embodiment.

Referring to FIG. 20, once a target profile is generated, as indicated at block 150, the process settings for the oven 10 (i.e., conveyor speed and oven zone temperature settings) may be determined at block 152. The conveyor speed of the oven is determined, for example, by first calculating a speed corresponding to each phase of the target profile by dividing the length of each phase (i.e., the length $l_{aligned}$) by the change in time for the respective phase ($\Delta t_{phase}$). Preferably the oven is set at a conveyor speed that is equal (or as close as the oven will allow), to the slowest of the speeds of the phases to ensure sufficient heating of the solder paste in that phase. Table 5, for example, shows the speed corresponding to each phase of the target profile of FIG. 8. As shown, the slowest speed, 32.55 in./min, corresponds to the reflow phase and therefore would be used to set the speed of the oven.

TABLE 5

| Phase | speed ($I_{aligned}/\Delta t_{phase}$) |
|---|---|
| Preheat phase | 32.61 in./min. |
| Soak phase | 32.64 in./min. |
| Reflow phase | 32.55 in./min |

The oven zone temperature settings (also referred to herein as temperature set points or zone settings) for achieving the target profile for a part conveyed through the oven (i.e., for heating a part according to the target profile) may be determined using the following equation:

$$T_{set} = \left[ \frac{T_2 - T_1}{1 - e^{-t/\tau}} \right] + T_1, \quad \text{(Equation 5)}$$

wherein $T_{set}$ is the set point of a zone, t is the time for the target profile in the zone, $T_2$ is the temperature of the target profile at the end of the zone, $T_1$ is the temperature of the target profile at the beginning of the zone and τ is the oven zone coefficient, which is a measure of the zone's ability to heat a part conveyed through the oven.

The coefficient π for each zone is determined empirically by conveying a standard part through the oven and measuring the temperature of the part at the beginning and end of each zone and the elapsed time in each zone. The measured values are used to calculate τ for each zone using the following equation:

$$\tau = -t \Big/ \ln\left[1 - \frac{T_{end} - T_{start}}{T_{set} - T_{start}}\right], \quad \text{(Equation 6)}$$

wherein t is the elapsed time in a zone, $T_{end}$ is the temperature of a part at the end of the zone, $T_{start}$ is the temperature of the part at the beginning of the zone and $T_{set}$ is the set point of the zone. Once obtained, the values for the oven zone coefficients may be used to calculate the temperature set points (Equation 5) for any target profile. The values for τ may be saved in a database or organized in a data table for future use.

The values for τ may be adjusted to account for certain thermal properties of the particular part to be reflowed in the oven, such as board thickness or the thermal mass of the "cold" component (described below). This may be accomplished using empirical data previously obtained for a part having the same or similar thermal properties. For example, using empirical data, multipliers corresponding to specific thermal properties can be determined, which then can be used to increase or decrease the values for τ accordingly.

After the set points have been determined, the accuracy with which these set points will achieve the target profile for a part conveyed through the oven may be tested (as indicated at block 154 of FIG. 20). This may be accomplished, for example, by conveying a test assembly coupled to an electronic data logger through the oven to record the temperature response of at least one component of the test assembly as it moves through the oven. Alternatively, means for measuring the temperature response of the test assembly other than a data logger may be used. For example, a remote temperature measuring device, such as an infrared or optical scanner may be used. In any event, the recorded data is used to generate an actual, or measured, temperature profile for the test assembly, which is compared to the target profile (as indicated at block 156 of FIG. 20). If there is no significant deviation of the measured profile from the target profile, the process may proceed directly to block 162 to commence a production run using the present oven settings. Otherwise, the process proceeds to block 158 for automatically adjusting the oven zone set points, as described below.

The data logger used in the verification process desirably includes temperature sensors, such as thermocouples, for connection to the "cold" component, the "hot" component and the sensitive component of the test assembly, although data loggers having more or less temperature sensors also may be used. The terms "cold" component and "hot" component as used herein refer to the components of PCB assembly having the greatest and smallest thermal mass, respectively, to be reflowed. A suitable data logger is the previously mentioned SuperM.O.L.E. Gold from Electronic Controls Design, Inc., of Milwaukie, Oreg.

When using a multiple sensor data logger, a profile may be generated for each component to which a temperature sensor is connected. These profiles are evaluated by the operator and a determination is made as to whether the temperature settings are suitable for production. Typically, the cold component will deviate to the "cold side" of the target profile (i.e., below the target profile) and the hot component will deviate to the "hot side" of the target profile (i.e., above the target profile). As mentioned, the cold component is the component with the greatest thermal mass and therefore provides the greatest load to be heated. If the cold component is not adequately heated, the solder paste will not reflow and wet the solder pads and the component leads to form an acceptable solder connection. Consequently, whether or not the present temperature settings are suitable for production typically depends on how close the cold component profile comes to matching the target profile. If it is determined that the cold component profile is accurate within an acceptable range while the hot or sensitive profiles exceed the recommended peak temperature for either the hot or sensitive component, the assembly may have to be redesigned and/or appropriate steps may have to taken to protect those components (e.g., providing insulation or using an oven with greater thermal transfer ability).

If there is significant deviation of one of the measured profiles (which is usually, but not always, the cold component profile) from the target profile or if a more accurate actual profile is desired, the oven zone set points may be automatically adjusted at block 158 of FIG. 20 to better achieve the target profile (i.e., bring the actual profile closer to the target profile). Deviation from the target profile may be caused, for example, by the physical characteristics of the assembly that affect the oven's ability to heat the assembly, such as, the thermal mass of the component that is reflowed and thermal conductivity of the board, which is determined to a large extent by board thickness. A relatively larger component, for example, provides a greater load, and therefore may require higher temperature settings than a relatively smaller component to achieve the same target profile. A relatively thicker board provides greater insulation (i.e., lower thermal conductivity), and therefore may require higher temperature settings than a relatively thinner board to achieve the same target profile.

The extent to which the temperature set points should be adjusted to account for any such deviation may be determined by first executing the algorithm of Equation 6 to obtain an oven zone coefficient τ for each zone using the values for $T_{end}$, $T_{start}$ and $T_{set}$ from a temperature: profile measured in the previous step (e.g., the cold component profile). Then, new oven zone temperature settings may be determined by again executing Equation 5 for each zone, except this time using the values of τ obtained in the previous step. The new oven zone temperature settings may be sent to the oven for automatically adjusting the oven zone set points (block 158 of FIG. 20).

At decision block 160 of FIG. 20, the user can decide to either begin production using the adjusted set points (block 162) or verify the adjusted oven zone set points by again conveying the instrumented test assembly through the oven and comparing the measured profile of the test assembly to the target profile (block 154 and 156). In addition, if desired, the oven zone set points may be further automatically fine-tuned or adjusted by again executing the algorithm provided in Equation 6 for each zone using the values for $T_{end}$, $T_{start}$ and $T_{set}$ from a profile measured in the previous step. Then, the algorithm of Equation 5 may be executed for each zone using the values for τ obtained in the previous step to obtain a new set of temperature settings. The new set of temperature settings may be sent to oven for automatically adjusting the oven zone set points (block 158). This process may be repeated as desired until an acceptable profile is achieved, at which point the operator can proceed with production (block 162).

In an alternative approach, the accuracy of the initial oven zone set points are verified as described above using the test assembly and data logger but the oven zone set points are manually adjusted to produce a corrected profile without executing the algorithm of Equation 7. Although less desirable, the initial oven zone set points may be used for a production run without first verifying the accuracy of the those set points or fine-tuning them to better achieve the target profile.

Profiling Software

The foregoing process may be implemented in the form of a user-friendly, graphic user interface software program stored on the computer 12. The computer 12 may be interfaced with the oven 10, such as illustrated in FIG. 1, to control the process settings of the oven. A working embodiment of a software program for profiling a conveyor oven is the AutoM.O.L.E. Xpert™ software, the operation of which is described below in connection with FIGS. 9–19. A computer monitor or other display means is used to display the various screens or windows of the program. A conventional computer mouse may be used to facilitate user interface with the program, as is well known in the art. Alternatively, means for facilitating user interface other than a computer mouse may be used, such as a touch screen, a light pen or the like.

Figure 9:
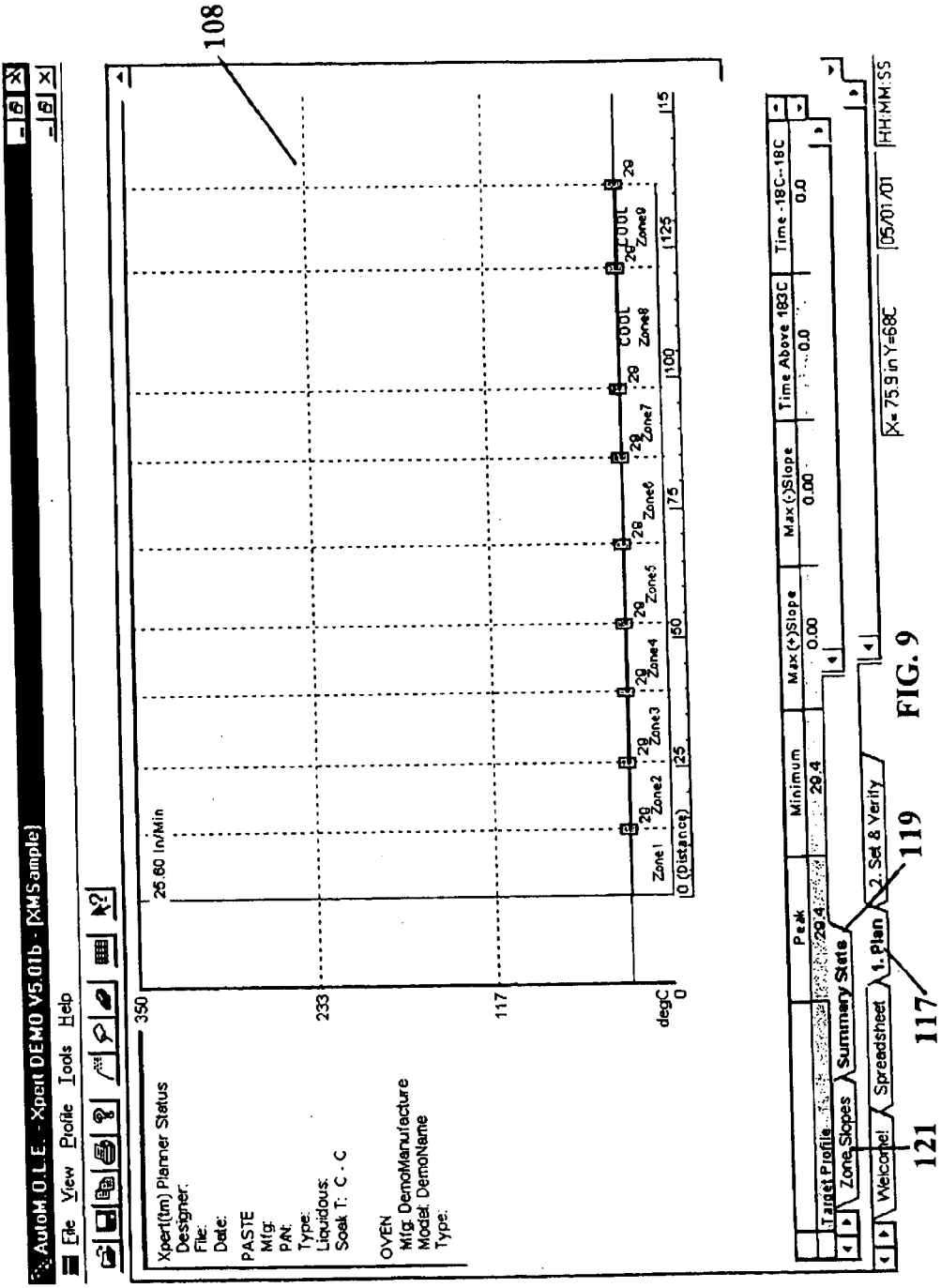
FIG. 9 shows the "Plan" worksheet window of the conveyor oven profiling software program according to a disclosed embodiment.

The illustrated program uses a worksheet tab format in which worksheets are accessed by a user by selecting or "clicking" the appropriate worksheet tab at the bottom of the screen with the computer mouse. FIG. 9 shows the "Plan" worksheet tab 117 activated to show the "Plan" worksheet in which a target profile for a soldering process is generated. As shown, the Plan worksheet displays a data graph 108 for displaying the target profile once generated. The vertical or Y-axis of the data graph is a temperature scale, which may be, for example, a Celsius scale as shown. Alternatively; the Y-axis may be converted into a Fahrenheit scale by selecting the "Units" command in the "Profile" drop down menu. For the X-axis, the user can select between four different scales, including a linear distance scale (as shown in FIG. 9) for indicating distance through the oven, a logged point scale, a time relative scale in which time is measured from the process origin and a time absolute scale in which time is measured from midnight. Dashed, vertical lines 116 divide the X-axis according to the lengths of the oven zones. In addition, dashed, horizontal temperature references lines 130 divide the Y-axis at 117° C. and 233° C.

Although not required, the program preferably contains an oven configuration database which includes data corresponding to a variety of commercially available reflow ovens. Such a database may include the zone lengths and oven zone coefficients (τ) associated with each of the reflow ovens. If an oven configuration database is not provided, then the program may be configured to query the user to enter the zone lengths and zone coefficients for the oven.

Figure 10:
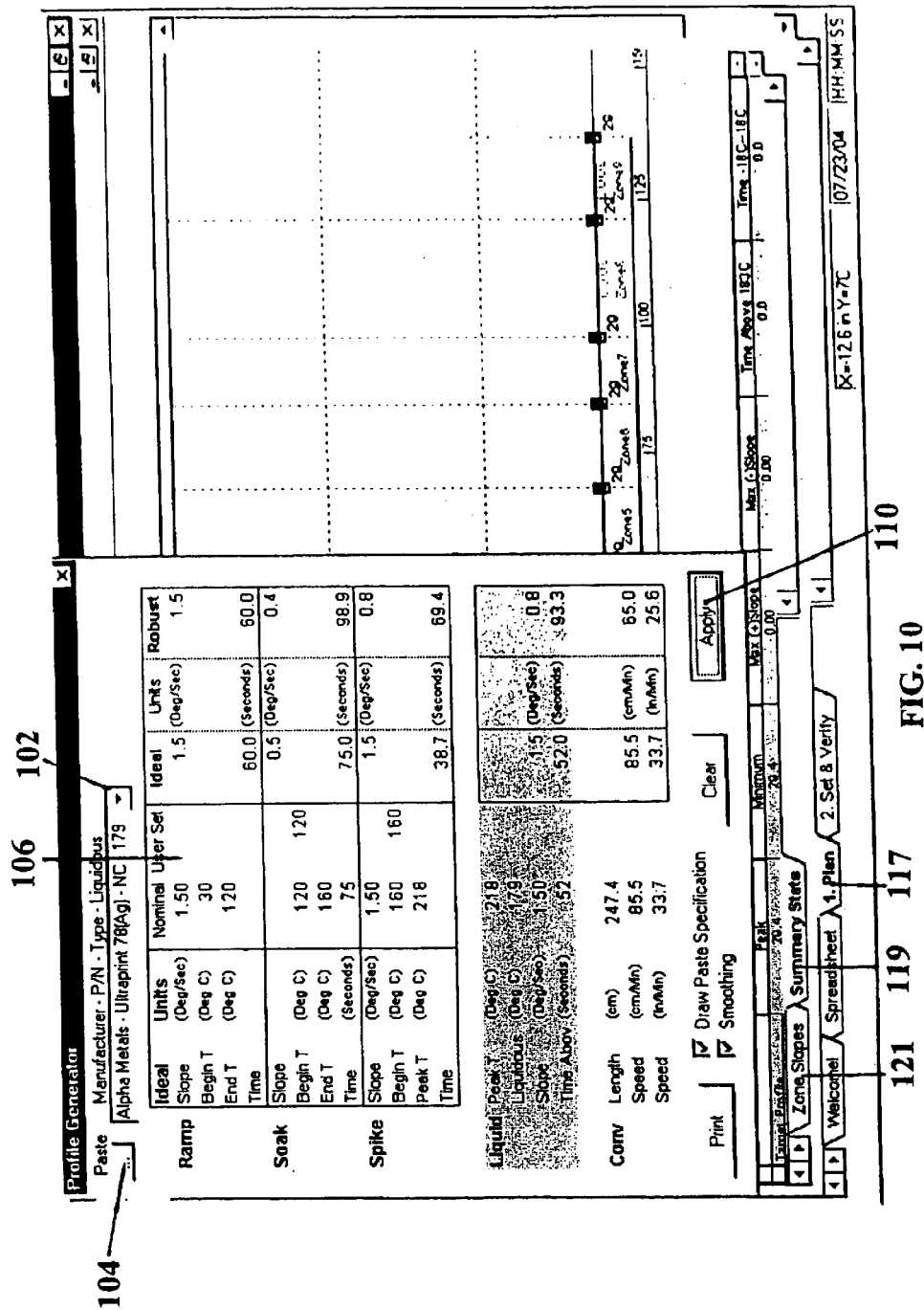
FIG. 10 shows the "Profile Generator" palette for selecting a solder paste from the solder paste database shown overlaying the "Plan" worksheet window of FIG. 9.

If the mouse cursor is moved to the left side of the Plan worksheet, a "Profile Generator" palette appears as shown in FIG. 10. The Profile Generator palette includes a solder paste database which includes the manufacturer's recommended solder paste specifications for a variety of commercially available solder pastes. A drop down list box (not shown) for selecting a solder paste appears by depressing the drop down button 102 on the Profile Generator palette. A Paste Specification (not shown) window showing the paste specifications for each solder paste in the database is accessible by selecting the unfold button 104 on the Profile Generator.

As shown, the Profile Generator palette displays a list of "ideal" parameters for the ramp (i.e., preheat), soak, spike and liquid phases for the selected solder paste and for the conveyor oven. The parameters for the spike and liquid phases collectively define the parameters for the reflow phase. The Profile Generator palette also displays a set of nominal values, user set values, ideal values and robust values for the ideal parameters.

The nominal values for the solder paste are derived from the specifications provided by the manufacturer of the paste as previously described. For example, where the paste specifications provide for an upper and lower limit, such as for the slope in the ramp and reflow phases and for the soak time, the nominal values are equal to the average of the respective upper and lower limits. Where applicable, the nominal values may be modified by the user in user set cells 106 to account for special manufacturing limitations that need to be followed for a particular component, board or process or to override the suggested values provided by the paste manufacturer. For example, it may be desirable to increase the peak temperature beyond what is recommended by the paste manufacturer to facilitate reflow of the solder paste if the components of the PCB assembly are not limited by the recommended peak temperature. The nominal value for the conveyor speed in the Profile Generator is equal to the length of the heating zones divided by the total time that the solder paste requires for the ramp, soak and reflow phases. The ideal value for each parameter is either the user set value for that parameter or the nominal value if a user set value is not given. A time-temperature graph constructed in accordance with the ideal values provides an ideal profile for (he solder paste (such as shown in FIG. 2).

The program automatically generates a target profile for the solder paste and displays numerical data from the target profile as "robust values" in the Profile Generator palette. The robust value for the conveyor speed is determined in the manner described above. Specifically, a speed corresponding to each phase of the target profile is calculated by dividing the length of each phase (i.e., the length $l_{aligned}$) by the change in time for the respective phase ($\Delta t_{phase}$). The robust value for the conveyor speed is equal (or as close as the oven will allow) to the slowest of the speeds of the phases to ensure sufficient heating of the solder paste in that phase.

Figure 11A:
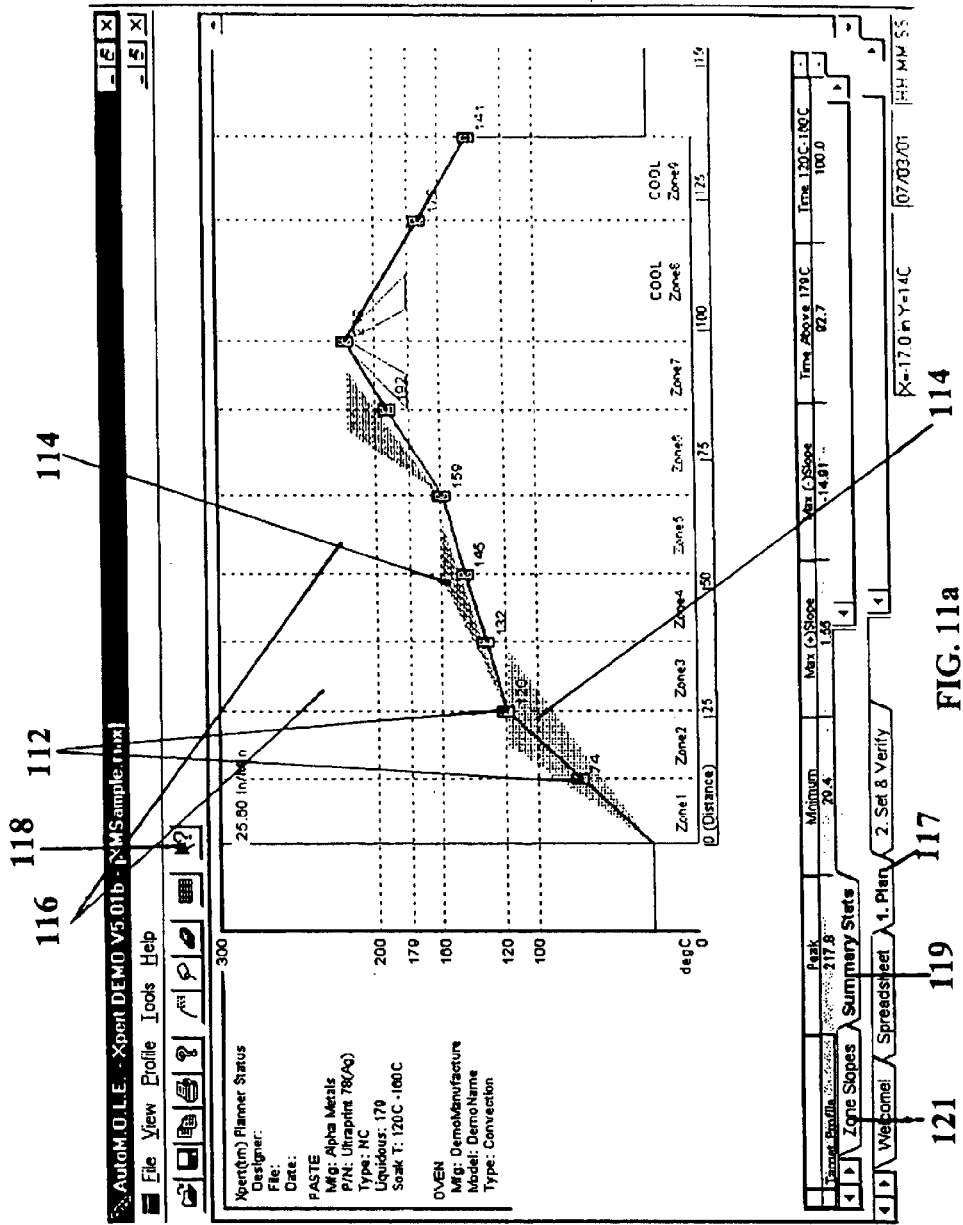
FIG. 11a shows a target profile displayed in the data graph of the "Plan" worksheet window of FIG. 9.
Figure 11B:
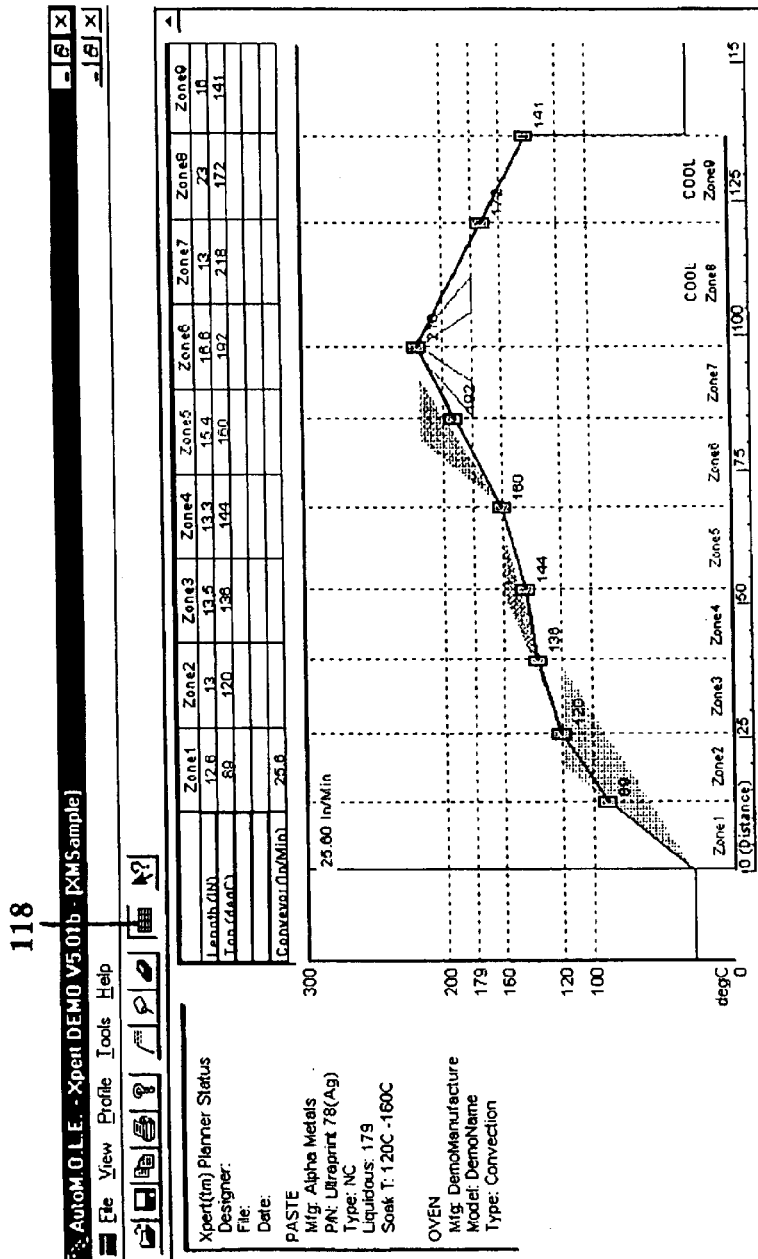
FIG. 11b shows the target profile of FIG. 11a after the smoothing feature of the program has been activated to minimize the rate of change of heating between phases.

By depressing the "Apply" button 110 on the Profile Generator palette, the program automatically displays the target profile on the data graph 108, as illustrated in FIG. 11a. Solder paste specification limits 114 may be displayed on the data graph such as shown in FIG. 11a by clicking the "Draw Paste Specification" check box at the bottom of the Profile Generator palette (FIG. 10). The target profile can be "smoothed" by clicking the "Smoothing" check box located under the "Draw Paste Specification" check box. FIG. 11b shows the smoothing feature applied to the target profile of FIG. 11a. As shown in FIG. 11b, the smoothing feature provides for a smoother target profile by slightly increasing or decreasing the slope of the target profile within each zone to reduce sudden rate changes between zones and thereby minimize the temperature difference between adjacent oven zones.

The target profile can be reshaped or modified by the user to account for any special manufacturing limitations that need to be followed for a component, board or process. The target profile also can modified to take into account other characteristics of the PCB assembly or oven of which the user is aware. In this manner, the user is permitted to contribute his own, skills or experience in the development of the target profile. In the illustrated embodiment, for example, drag boxes 112 are positioned along the target profile on the vertical lines 116 marking the end of each oven zone. The drag boxes 112 are vertically adjustable along lines 116 to allow the user to dynamically adjust the temperature of the target profile at the end of each zone. Consequently, dragging a box 112 vertically upward will increase the temperature of the target profile at the end of the respective zone as well as increase the slope of the profile in the zone to the left of the box and decrease the slope of the profile in the zone to the right of the box. Conversely, dragging a box vertically downward will decrease the temperature of the target profile at the end of the respective zone as well as decrease the slope of the profile in the zone to the left of the box and increase the slope of the profile in the zone to the right of the box.

The Plan worksheet includes a "Summary Stats" data tab 119 and a "Zone Slopes" data tab 121, which when active causes a data table to be displayed below the data graph. When the "Summary Stats" data tab is active (FIG. 11a), a data table displays a summary of the primary statistics for the target profile, including the peak temperature, minimum temperature, maximum slope, minimum slope, the time above the liquidous temperature (179° C. in this example) and the time between $T_{minsoak}$ and $T_{maxsoak}$ (the time between 120° C. and 160° C. in this example). When the "Zone Slopes" data tab is active (FIG. 11b), a data table below the data graph displays the average slope for the target profile in each zone. As further shown in FIG. 11b, a "Zone Matrix" button 118 in the tool bar, when depressed, causes another data table to be displayed above the data graph. This table provides values for the length of each zone and the temperature of the target profile at the end of each oven zone.

Other features of the Plan worksheet include an X-Y readout 120 provided at the bottom of the worksheet. The X-Y readout continuously displays the X and Y-axes values for the position of the mouse pointer on the data graph. The units displayed in the X-Y readout are the same as those displayed on the data graph axes. In addition, a "Slope" command (not shown) in the "Tools" pull down menu automatically calculates and displays the slope of a line drawn on the data graph by the user. A "Measure" command (not shown) in the "Tools" pull down menu automatically calculates and displays the difference between the X and Y-axes values of the end points of a line drawn on the data graph.

Figure 12:
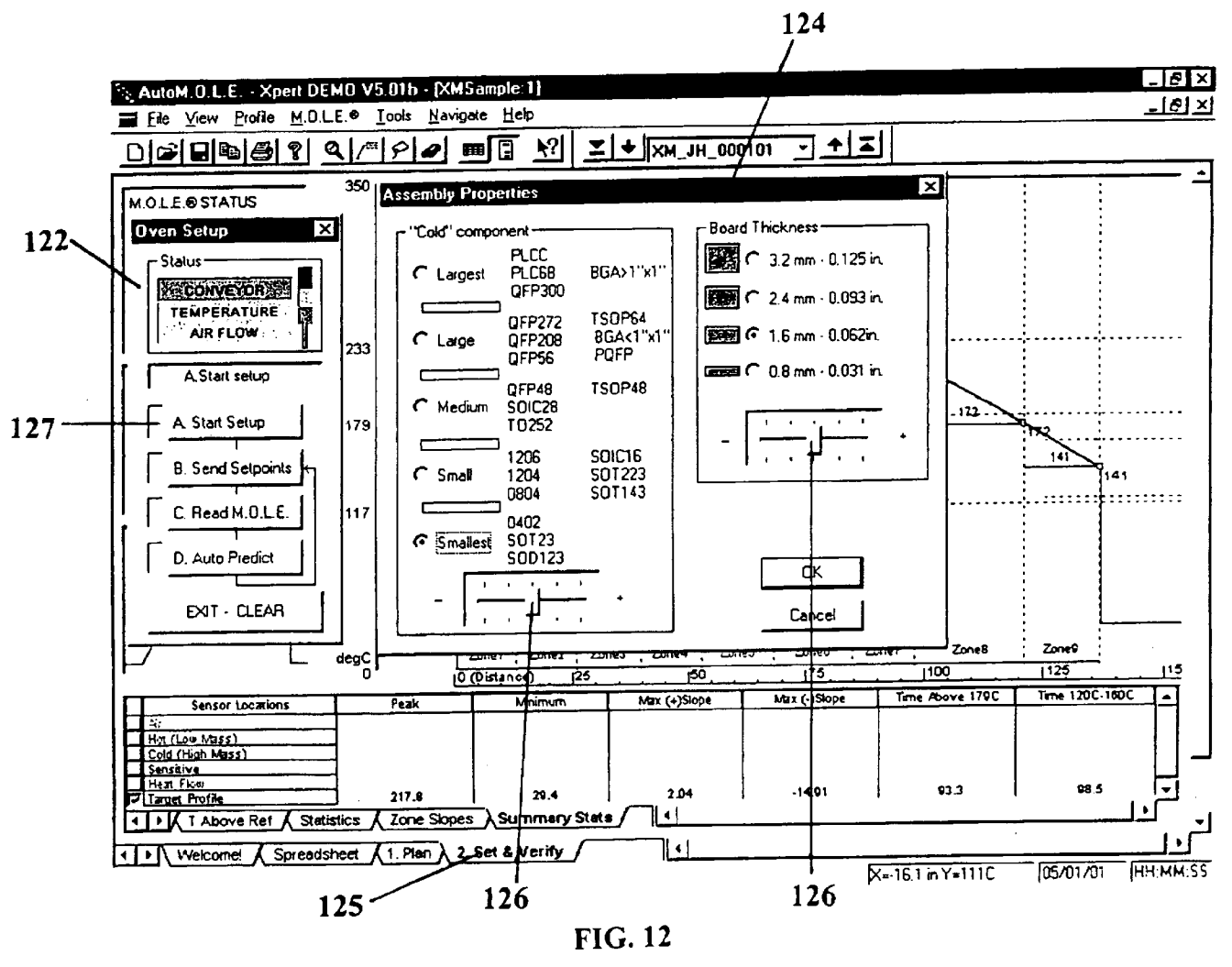

Once the target profile is generated, the "Set & Verify" worksheet (FIGS. 12–18) is selected by clicking on the "Set & Verify" worksheet tab 125. When active, the "Set & Verify" worksheet displays an "Oven Setup" palette 122 to facilitate oven setup and verification of the accuracy of the process settings. Referring to FIG. 12, depressing the "A. Start Setup" button 127 on the Oven Setup window causes an "Assembly Properties" palette 124 to appear for entering the thermal characteristics of the PCB assembly to be conveyed through the oven. As, shown, the Assembly Properties palette 124 contains several "cold" component categories and several board thickness categories. Each cold component category comprises a set of similarly sized, standard PCB components and each board thickness category comprises a range of board thicknesses. Here, an operator selects a cold component category and a board thickness category that most accurately describes the assembly to be conveyed through the oven. Sliding bars 126 can be used to increase or decrease the value of the selected category for the cold component and board thickness.

Figure 13:
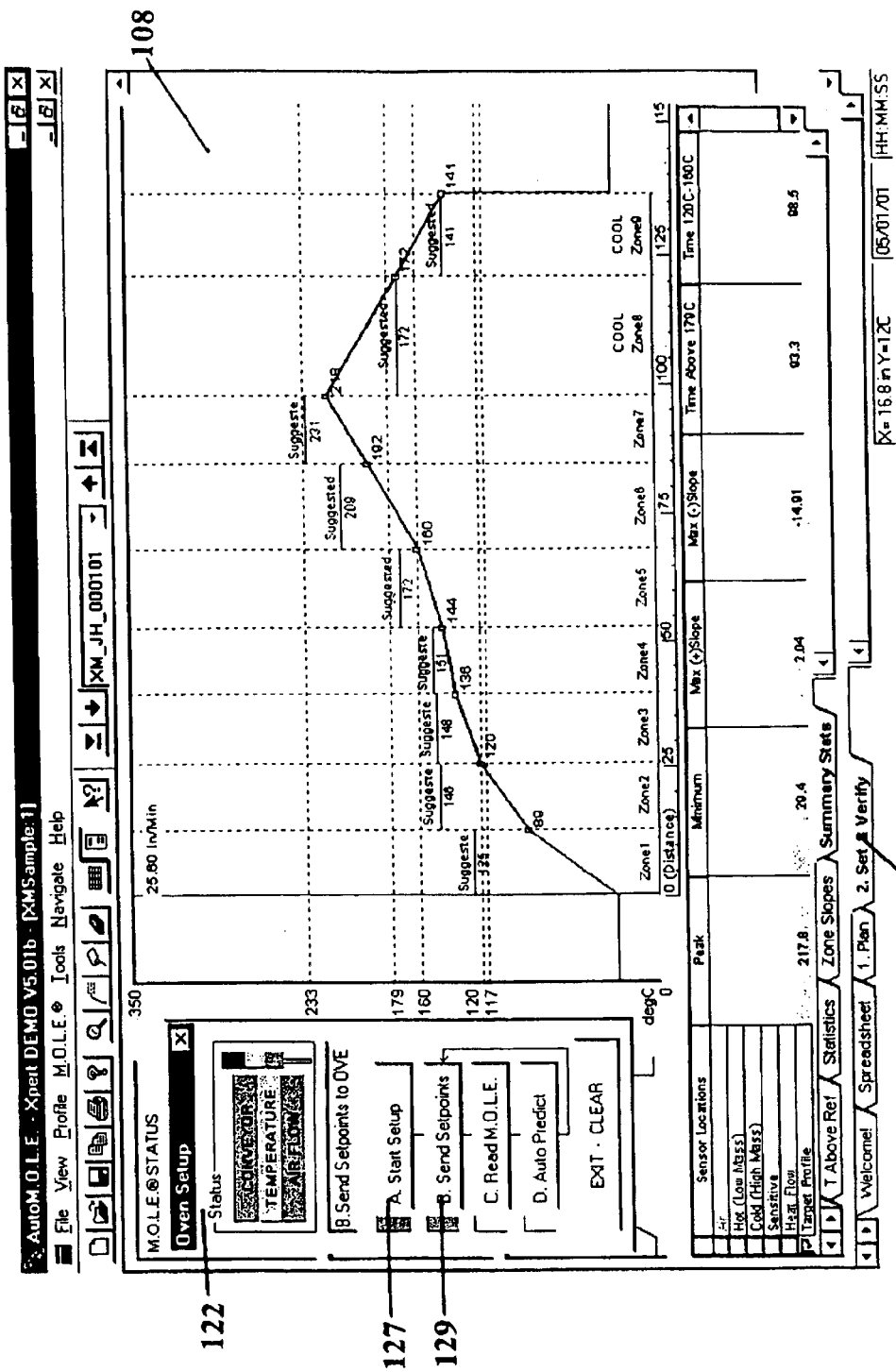
FIG. 13 shows the target profile and suggested oven zone temperatures displayed in the data graph of the "Set & Verify" worksheet.

Upon selection of the "OK" command button on the Assemblies Properties palette, the program calculates suggested oven zone temperatures based upon the target profile and the thermal characteristics of the PCB assembly (i.e., the cold component and board thickness). More specifically, the program executes the algorithm provided in Equation 5 above for each oven zone to provide a set of suggested set points for the oven zones. In executing Equation 5 for each oven zone, the values for the oven zone coefficients t are previously measured oven zone coefficients, taken from a database of oven zone coefficients and then adjusted to account for the cold component and board thickness. As shown in FIG. 13, the suggested set points are displayed on the data graph 108 within their respective oven zone along with a horizontal temperature bar at a vertical position corresponding to that temperature on the temperature scale. By depressing the "B. Send Setpoints" button 129 on the Oven Setup palette 122, the program automatically sends the process settings to the oven's controller which in turn automatically sets the conveyor speed and oven zone temperatures.

Figure 14:
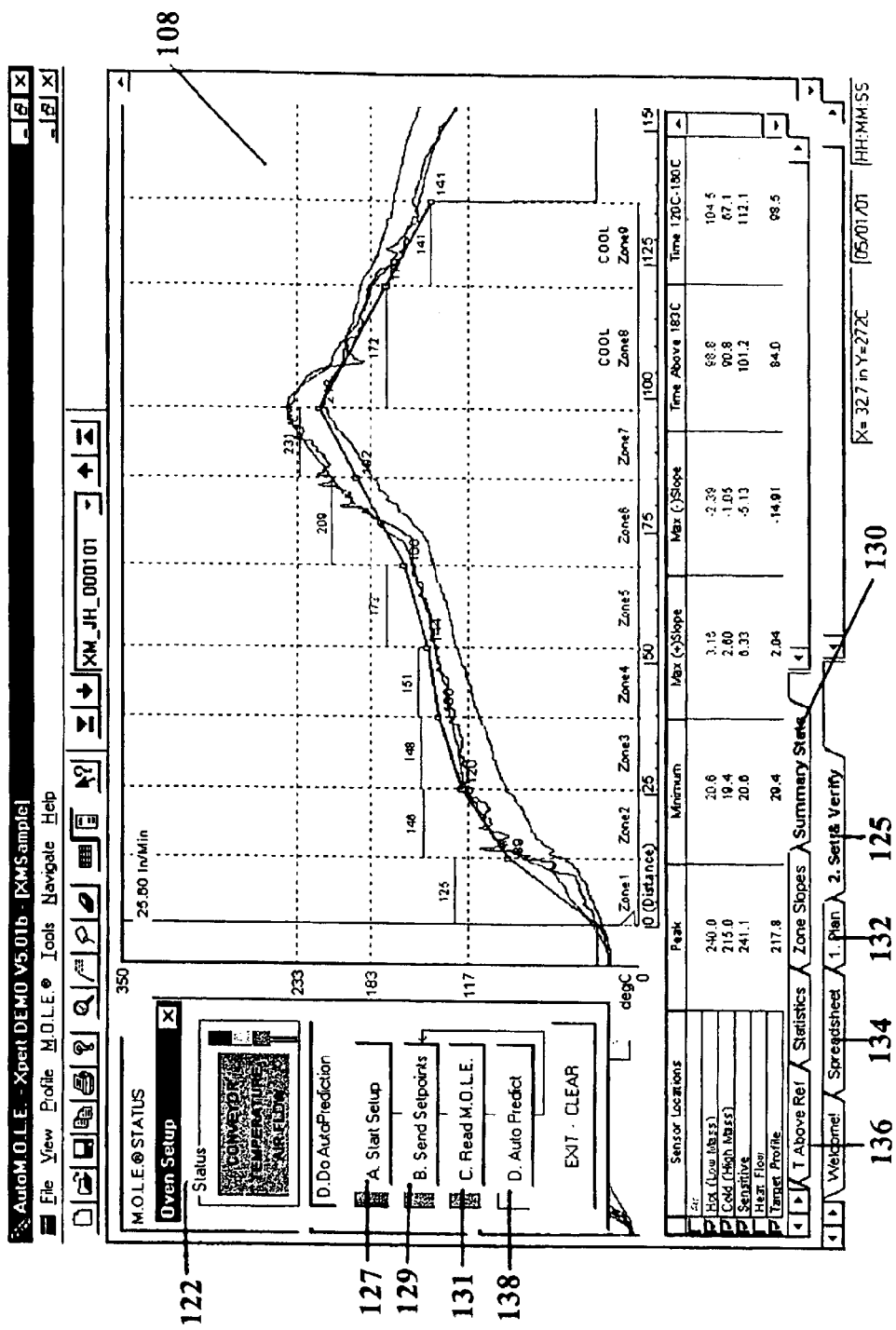
FIG. 14 shows the target profile and the measured profiles of the hot, cold and sensitive components of an instrumented test PCB assembly displayed in the data graph of the "Set & Verify" worksheet wherein the "Summary Stats" data tab is active to show the primary statistics of the profiles in the data table.

After the oven has stabilized at the suggested set points, the accuracy with which the suggested zone temperatures are able to achieve the target profile for the PCB assembly may be verified. This is accomplished by connecting the temperature sensors of a data logger to the cold, hot and sensitive components of a test PCB assembly and conveying the data logger and the test assembly through the oven, after which the data stored on the data logger are uploaded to the computer 12. By depressing the "C. Read M.O.L.E." button 131 on the Oven Setup palette 122, the program reads this data and displays data plots, or profiles, for each component to which a temperature sensor is connected on the data graph 108 along with the target profile, as shown in FIG. 14. Each profile may be displayed in a different color in the data graph to facilitate identification of the profiles with their associated assembly component. In addition, a data table below the data graph displays information relating to each of the data plots. A data plot can be suppressed or restored by clicking the check box with the corresponding sensor description in the data table.

Figure 15:
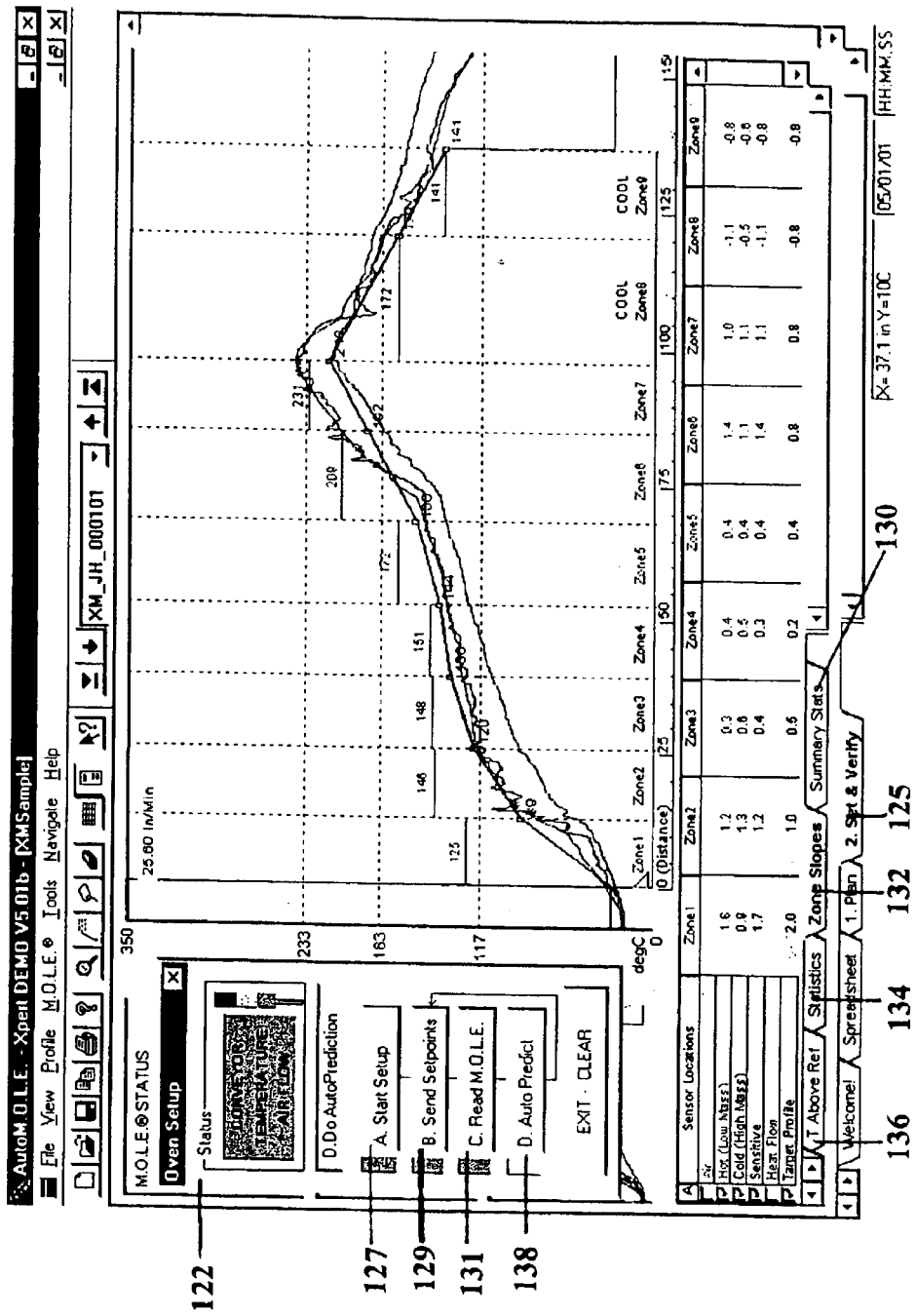
FIG. 15 shows the "Set & Verify" worksheet window of FIG. 14 in which the "Zone Slopes" data tab is active.
Figure 16:
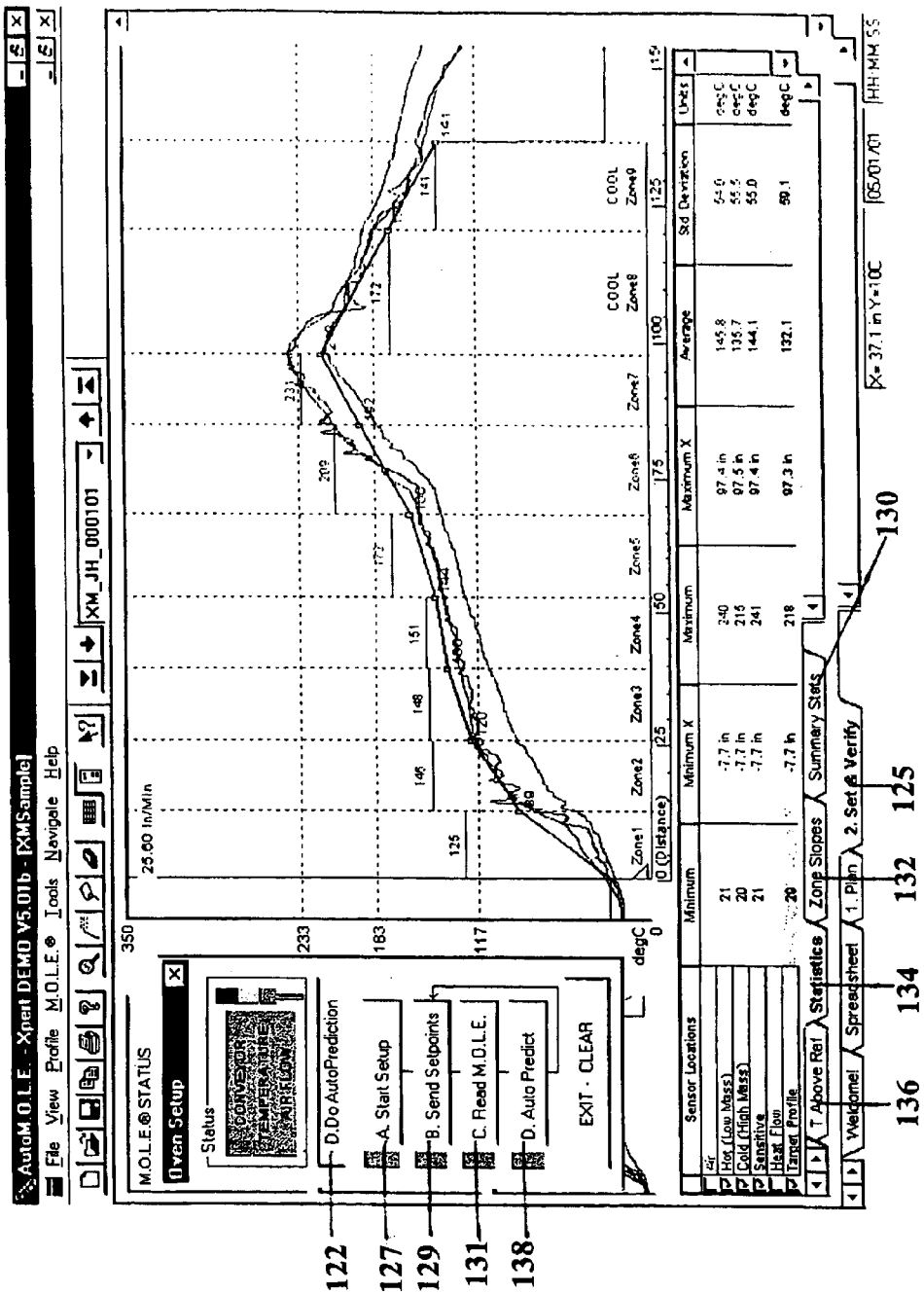
FIG. 16 shows the "Set & Verify" worksheet window of FIG. 14 in which the "Statistics" data tab is active.
Figure 17:
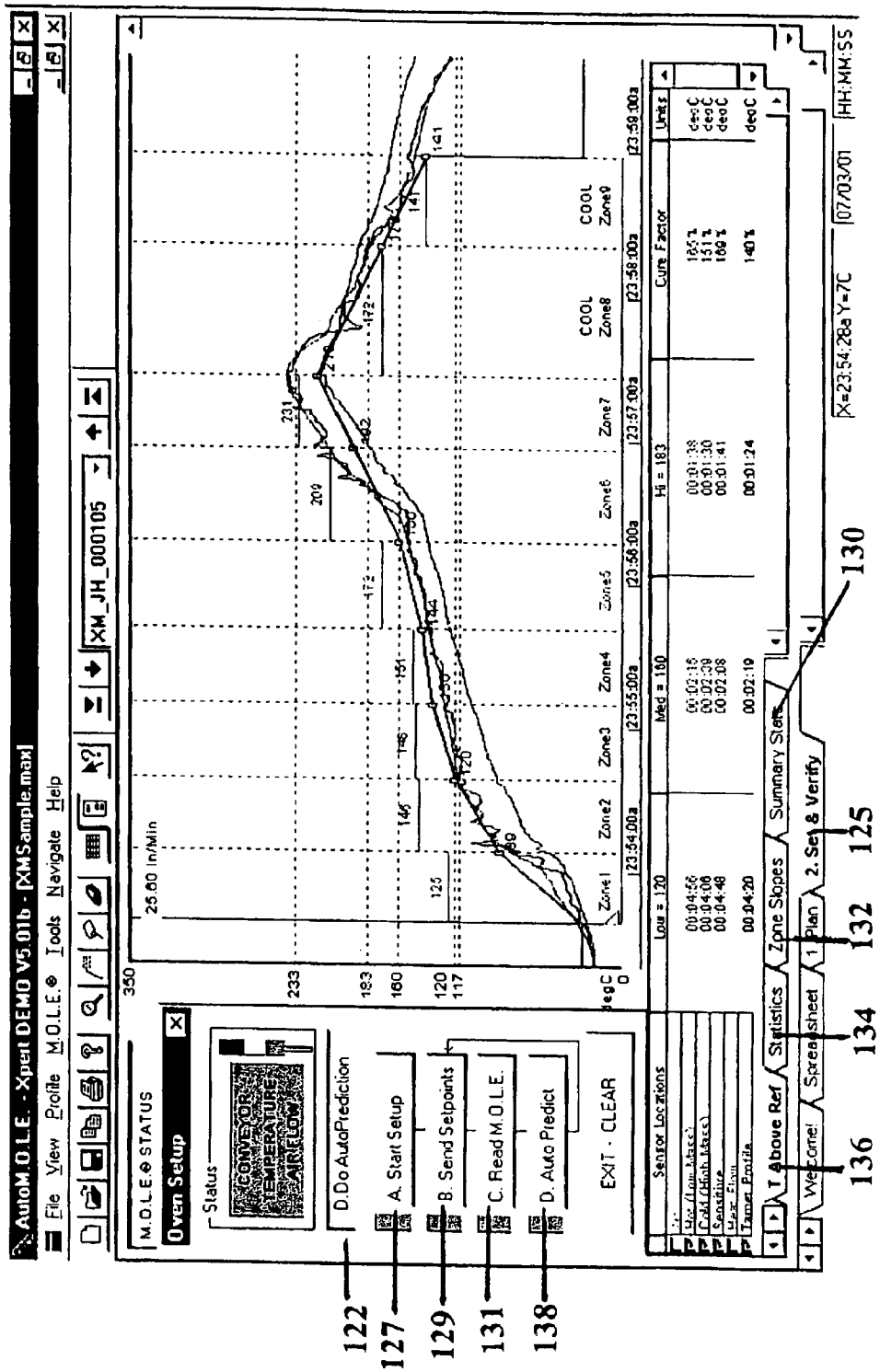
FIG. 17 shows the "Set & Verify" worksheet window of FIG. 14 in which the "T Above Ref" data tab is active.

The Set & Verify worksheet contains four data tabs for displaying different statistical information relating to the data plots in the data table: a "Summary Stats" data tab 130, a "Zone Slopes" data tab 132, a "Statistics" data tab 134 and a "T Above Ref" data tab 136. When the "Summary Stats" data tab 130 is selected, as shown in FIG. 14, the data table displays a summary of primary statistics of the data plots. When the "Zone Slopes" tab 132 is selected, as shown in FIG. 15, the data table displays the average slope in each zone of each data plot. The "Statistics" tab 134, which is shown as active in FIG. 16, displays the minimum and maximum temperature for each data plot and the value of the X-axis coordinate at which it occurred. The data table also displays the average (mean) and the standard deviation of the temperature values recorded for each sensor. As shown in FIG. 17, the "T Above Ref" data tab 136 displays in the data graph the amount of time each sensor measured temperature data above the temperature references lines for $T_{minsoak}$ (120° C. in this example), $T_{maxsoak}$ (160° C. in this example) and $T_{liquidous}$ (183° C. in this example).

Figure 18:
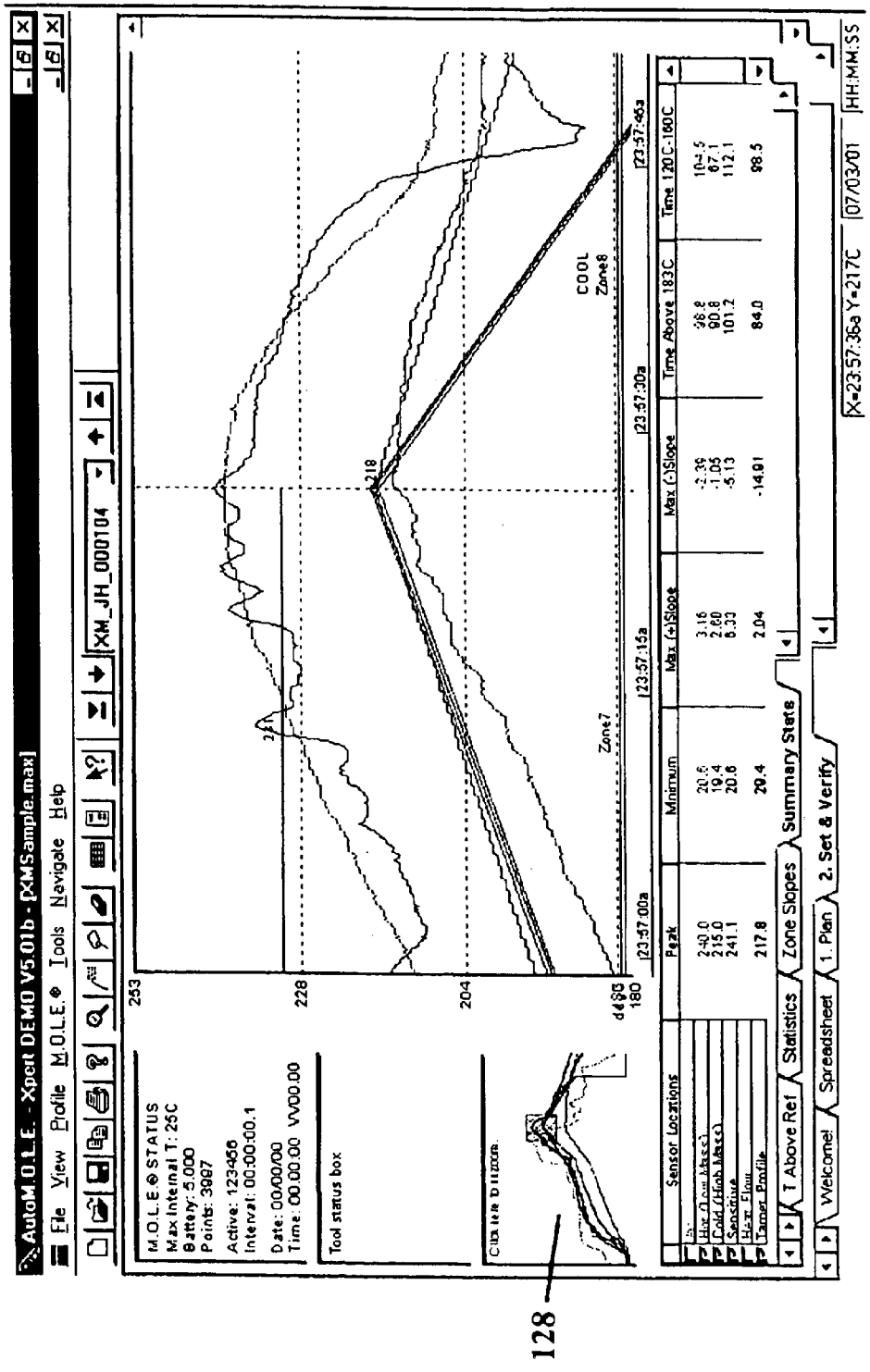
FIG. 18 shows a magnified portion of the target profile displayed in the data graph of the "Set & Verify" worksheet window.

The Set & Verify worksheet also includes a "Magnify" command in the "Tools" pull down menu that allows a user to select a portion of the data graph for magnification, such as shown in FIG. 18. A magnify map 128 displays a small map of the entire data graph and indicates the portion currently magnified with a crosshatched box.

If it is determined that the measured profiles, and in particular the profile for the cold component, are sufficiently close to the target profile, the user can accept the current oven set points and proceed with production. Otherwise, the "auto prediction" feature of the program may be used to automatically fine-tune the oven zone temperatures to better achieve the target profile for the cold component.

Figure 19:
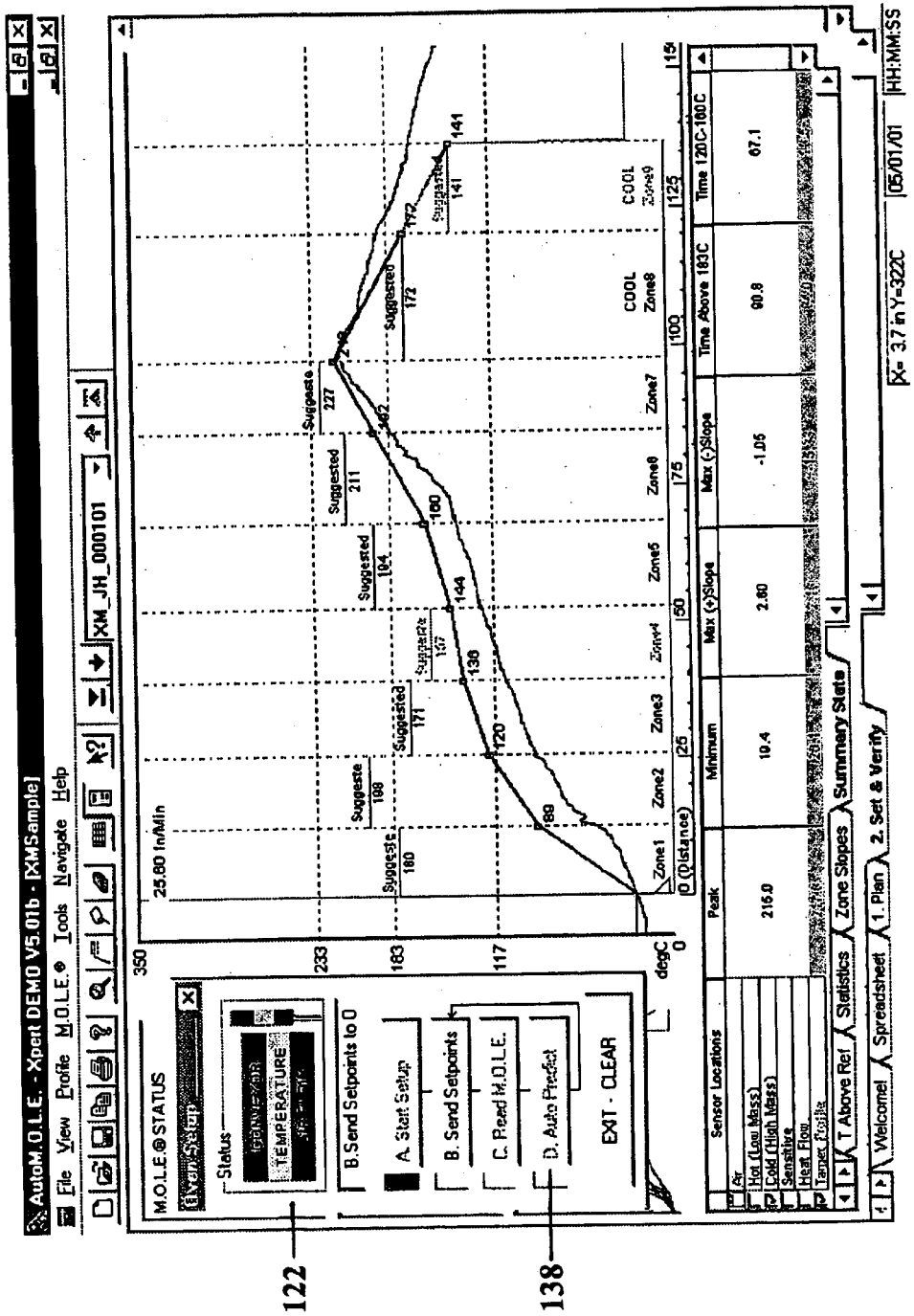
FIG. 19 shows the "Set & Verify" worksheet window after the auto prediction process: is completed in which the adjusted oven zone temperatures obtained from the auto prediction process are shown in the data graph.

To perform an auto prediction, the "D. Auto Predict" command button 138 on the Oven Setup palette 122 is selected. When the "D. Auto Predict" command button 138 is selected, the program first executes the algorithm of Equation 6 for each zone using the values for $T_{end}$, $T_{start}$ and $T_{set}$ from the data plot with the lowest peak temperature, which in the illustrated example is the cold component profile, to provide new set of oven zone coefficients ($\tau$). Then, new oven zone temperature settings are determined by again executing Equation 5 for each zone, except this time using the values of $\tau$ obtained in the previous step. After the auto prediction process is complete, the zone temperature bars corresponding to the new oven zone temperatures are displayed on the data graph, as shown in FIG. 19. The auto predict process typically provides adjusted zone temperatures that are capable of achieving the target profile within about 2° C. or less.

Selecting the "B. Send Setpoints" command button 129 sends the new, suggested zone temperatures to the oven, which automatically sets the temperature settings of the oven zones at those levels. Once the oven has stabilized at the new temperature settings, production may be commenced, or alternatively, the process of verifying the accuracy of the new zone temperatures with an instrumented test assembly may be repeated before proceeding with production. Although the first application of the auto predict typically will provide temperature settings that are sufficiently accurate for most reflow applications, if desired, another auto predict may be executed to further fine-tune the temperature settings to correct for any deviation from the target profile. The auto predict process may be repeated as desired until iteration yields an acceptable solution, although as a practical matter, only one auto predict typically is necessary.

The present invention has been shown in the described embodiments for illustrative purposes only. The present invention may be subject to many modifications and changes without departing from the spirit or essential characteristics thereof. We therefore claim as our invention all such modifications as come within the scope of the following claims.

We claim:

1. A method of controlling a soldering process in a multiple zone conveyor oven, the method comprising:

providing an ideal temperature profile for a solder paste to be reflowed in the oven during the soldering process, the temperature profile of the solder paste comprising a preheat phase, a soak phase, and a reflow phase; and applying the ideal profile of the solder paste to the oven by aligning a beginning of each phase of the ideal profile with a forward end of an oven zone so as to form a target profile for use in determining process settings of the soldering process.

2. The method of claim 1 further comprising manually adjusting the temperature of the target profile at a point where the target profile coincides with the forward end of an oven zone.

3. The method of claim 1 further comprising determining temperature set points of the oven zones for effecting the target profile when the solder paste is conveyed through the oven.

4. The method of claim 3 wherein the solder paste is disposed on a PCB assembly and determining the temperature set points of the oven zones includes accounting for a thermal mass of a cold component and a board thickness of the PCB assembly.

5. The method of claim 3 further comprising heating the solder paste in the oven and measuring the temperature profile of the solder paste.

6. The method of claim 5 further comprising comparing the temperature profile of the solder paste to the target profile and if there is any deviation between the temperature profile of the solder paste and the target profile, automatically adjusting the temperature set points of the oven to account for the deviation and better achieve the target profile upon farther operation of the oven.

7. The method of claim 1 further comprising generating multiple profiles in which each phase is aligned with a forward end of an oven zone and selecting the profile that best fits the oven as the target profile for use in determining the process settings of the soldering process.

8. A method of controlling a soldering process in a conveyor oven having multiple heating zones, the method comprising:

determining an oven zone coefficient of each heating zone of the oven;

selecting a solder paste to be reflowed in the oven, the paste having an ideal temperature profile; and generating a target profile for the oven by adjusting the ideal profile to fit the zones of the oven.

9. The method of claim 8, further comprising determining temperature set points of the oven for effecting the target profile when the solder paste is conveyed through the oven.

10. The method of claim 8, wherein the ideal temperature profile includes a preheat phase, soak phase, and reflow phase and generating a target profile comprises adjusting the ideal profile so that the beginning of each phase of the ideal profile is aligned with a forward end of an oven zone.

11. The method of claim 8 further comprising setting temperature set points of the oven, heating the solder paste in the oven, measuring a temperature profile of the solder paste as it is conveyed through the oven and displaying the temperature profile of the solder paste.

12. The method of claim 8 further comprising automatically setting temperature set points of the oven.

13. The method of claim 8 further comprising automatically setting a conveyor speed of the oven.

14. The method of claim 13 further comprising displaying solder paste specification limits with the target profile.

15. The method of claim 8 further comprising displaying the target profile, the target profile having a vertical axis comprising a temperature scale and a horizontal axis comprising a scale indicating a linear distance through the oven.

16. The method of claim 15 further comprising allowing the user to manually adjust the temperature of the target profile at a beginning of one or more of the oven zones through a drag and drop operation.

17. The method of claim 8 further comprising heating the solder paste in the oven, measuring the temperature profile of the solder paste and if there is any deviation between the temperature profile of the solder paste and the target profile, adjusting temperature set points of the oven to achieve a profile for the solder paste that substantially matches the target profile upon further use of the oven.

18. An apparatus for controlling a soldering process in which solder paste is reflowed in a multiple zone conveyor oven, the soldering process having a preheat phase, a soak phase, a reflow phase and a cooling phase, the apparatus comprising:

means for providing an ideal temperature profile derived from solder paste specifications of the solder paste to be reflowed in the oven; and means for generating a target temperature profile for the soldering process in which a beginning of each phase coincides with a forward end of an oven zone.

19. The apparatus of claim 18 further comprising a database containing solder paste specifications for a plurality of solder pastes and means for selecting a solder paste from the database to be flowed in the oven.

20. The apparatus of claim 19 further comprising means for determining the temperature profile of the solder paste when conveyed through the oven and means for automatically adjusting the temperature settings of the oven to reduce any deviation between the temperature profile of the solder paste and the target profile.

21. The apparatus of claim 18 further comprising means for displaying the target temperature profile.

22. The apparatus of claim 18 further comprising means for adjusting a temperature of the target profile at a point where the target profile coincides with the forward end of an oven zone.

23. The apparatus of claim 18 further comprising means for determining temperature settings of the oven zones for heating the solder paste generally in accordance with the target profile.

24. An apparatus for determining process settings for reflowing solder paste in a multiple zone conveyor oven, the apparatus comprising:

a computer for interfacing with the oven, the computer comprising memory means on which there is stored a plurality of ideal Parameters of the solder paste to be reflowed in the oven, the ideal parameters defining an ideal temperature profile, and means for generating a target profile from the ideal parameters, wherein the target profile includes a preheat phase, a soak phase and a reflow phase.

25. The apparatus of claim 24 wherein the computer has a display means for displaying the target profile.

26. The apparatus of claim 25 further comprising a user interface means operable to permit adjustment of the displayed target profile by an operator.

27. The apparatus of claim 24 further comprising means for calculating set points of the oven zones for heating the solder paste generally in accordance with the target profile.

28. The apparatus of claim 27 further comprising means for automatically setting the set points of the oven.

29. The method of claim 28 wherein the heating process is a soldering process for reflowing solder paste on a PCB assembly, the soldering process having a preheat phase, a soak phase and a reflow phase.

30. A method for determining the temperature settings of a multiple zone conveyor oven for a heating process in which a part is conveyed through the oven, the process having multiple phases, wherein in each phase the part is heated from an initial temperature to a final temperature, the method comprising:

determining a target temperature profile for the part by aligning the initial temperature of each phase with a forward end of an oven zone; and calculating a temperature setting for each oven zone for effecting the target profile when the part is conveyed through the oven.

31. A computer-readable medium storing computer-executable instructions for causing a computer system to perform the method of claim 1.

32. A computer-readable medium storing computer-executable instructions for causing a computer system to perform the method of claim 30.

33. A conveyor oven profiling system for determining process settings for reflowing solder paste in a multiple zone conveyor oven, the system comprising:

a computer for interfacing with the oven, the computer comprising memory on which there is stored a plurality of ideal parameters of the solder paste to be reflowed in the oven, the ideal parameters defining an ideal temperature profile, the computer being configured to generate a target profile from the ideal parameters, wherein the target profile includes a preheat phase, a soak phase and a reflow phase.

34. The system of claim 33, wherein the computer is operable to calculate set points of the oven zones for heating the solder paste generally in accordance with the target profile.

35. The system of claim 34, wherein the computer communicates with the oven to automatically set the set points of the oven.

\* \* \* \* \*

UNITED STATES PATENT AND TRADEMARK OFFICE
CERTIFICATE OF CORRECTION

PATENT NO. : 6,799,712 B1
APPLICATION NO. : 10/043728
DATED : October 5, 2004
INVENTOR(S) : Paul M. Austen et al.

It is certified that error appears in the above-identified patent and that said Letters Patent is hereby corrected as shown below:

Column 4, line 21, "process:" should read -- process --

Column 5, line 54, "$t_0$ "should read -- $t_1$ --

Column 7, line 42, "after," should read -- after --

Column 10, line 15, "$NF/l_{ideal}$" should read -- $MF/l_{ideal}$ --

Column 10, line 62, "$\pi$" should read -- $\tau$ --

Column 11, line 52, "Oreg." should read -- Oregon. --

Column 12, line 63, "algorithm" should read -- algorithms --

Column 13, line 26, "Alternatively;" should read -- Alternatively, --

Column 14, line 22, "(he" should read -- the --

Column 14, line 57, "own, skills" should read -- own skills --

Column 15, line 47, "As, shown" should read -- As shown --

Column 15, line 66, "t" should read -- $\tau$ --

Column 18, line 5, "farther" should read -- further --

Column 19, line 24, "Parameters" should read -- parameters --

Signed and Sealed this

Fifteenth Day of August, 2006

JON W. DUDAS
*Director of the United States Patent and Trademark Office*